(12) United States Patent
Kohr et al.

(10) Patent No.: US 7,160,354 B2
(45) Date of Patent: *Jan. 9, 2007

(54) HIGH TEMPERATURE HEAP BIOLEACHING PROCESS

(75) Inventors: William J. Kohr, San Mateo, CA (US); Vandy Shrader, Belmont, CA (US); Chris Johansson, San Bruno, CA (US)

(73) Assignee: Geobiotics, LLC, Lakewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/964,208

(22) Filed: Oct. 12, 2004

(65) Prior Publication Data

US 2005/0103162 A1    May 19, 2005

Related U.S. Application Data

(63) Continuation of application No. 10/086,647, filed on Feb. 28, 2002, now Pat. No. 6,802,888, which is a continuation of application No. 09/650,319, filed on Aug. 29, 2000, now abandoned, which is a continuation-in-part of application No. 09/212,579, filed on Dec. 14, 1998, now Pat. No. 6,110,253.

(51) Int. Cl.
C22B 15/00    (2006.01)

(52) U.S. Cl. ....................................... 75/721
(58) Field of Classification Search .................. 75/712, 75/743; 423/27, DIG. 17
See application file for complete search history.

(56) References Cited

U.S. PATENT DOCUMENTS

| | | | |
|---|---|---|---|
| 3,785,944 | A | 1/1974 | Atwood et al. |
| 3,856,913 | A | 12/1974 | McElroy et al. |
| 3,949,051 | A | 4/1976 | Pawlek |
| 4,173,519 | A | 11/1979 | Parker et al. |
| 4,729,788 | A | 3/1988 | Hutchins et al. |
| 5,196,052 | A | 3/1993 | Gross et al. |
| 5,246,486 | A | 9/1993 | Brierley et al. |

(Continued)

FOREIGN PATENT DOCUMENTS

EP    0 522 978 A1    1/1993

(Continued)

OTHER PUBLICATIONS

Ahonen, L. and O.H. Tuovinen, *Bacterial Leaching of Chalcopyrite-Containing Ores in the Presence of Silver and Graphite in Shake Flasks*, in International Symposium of Biohydrometallurgy, 1989, Jackson Hole, Wyoming: Canadian Centre for Mineral and Energy Technology, pp. 25-34.

(Continued)

*Primary Examiner*—Roy King
*Assistant Examiner*—Kathleen A McNelis
(74) *Attorney, Agent, or Firm*—Jones Day

(57) ABSTRACT

A heap is constructed with hypogenic copper sulfide bearing ore to include exposed sulfide mineral particles at least 25 weight % of which are hypogenic copper sulfides. The concentration of the exposed sulfide mineral particles is such that the heap includes at least 10 Kg of exposed sulfide sulfur per tonne of solids in the heap. At least 50% of the total copper in the heap is in the form of hypogenic copper sulfides. A substantial portion of the heap is heated to at least 50° C. The heap is inoculated with a thermophilic microorganism, and bioleaching is carried out so that sufficient sulfide mineral particles in the heap are biooxidized to oxidize at least 10 Kg of sulfide sulfur per tonne of solids in the heap and to cause the dissolution of at least 50% of the copper in the heap in a relatively short period of time.

20 Claims, 9 Drawing Sheets

U.S. PATENT DOCUMENTS

| | | | |
|---|---|---|---|
| 5,332,559 | A | 7/1994 | Brierley et al. |
| 5,431,717 | A | 7/1995 | Kohr |
| 5,573,575 | A | 11/1996 | Kohr |
| 5,611,839 | A | 3/1997 | Kohr |
| 5,676,733 | A | 10/1997 | Kohr |
| 5,688,304 | A | 11/1997 | Kohr et al. |
| 5,730,776 | A | 3/1998 | Collins et al. |
| 5,763,259 | A | 6/1998 | Panos |
| 5,766,930 | A | 6/1998 | Kohr |
| 5,779,762 | A | 7/1998 | Kohr et al. |
| 5,800,593 | A | 9/1998 | Kohr |
| 5,873,927 | A | 2/1999 | Schaffner et al. |
| 6,110,253 | A * | 8/2000 | Kohr et al. ............... 75/712 |
| 6,802,888 | B1 * | 10/2004 | Kohr et al. ............... 75/712 |

FOREIGN PATENT DOCUMENTS

| | | |
|---|---|---|
| WO | WO 00/36168 | 6/2000 |

OTHER PUBLICATIONS

Almendras, E, et al., *Surface Transformation and Electrochemical Response of Chalcopyrite in the Bacterial Leaching Process.*, International Symposeum of Biohydrometallurgy, pp. 259-272 (Warwick United Kingdom: Science and Technology Letters, 1987).

Ammou-Chokrourn, M., P. Sen, and F. Fouques, *Electrooxidation of Chalcopyrite in Acid Chloride Medium; Kinetics, Stoichiometry and Reaction Mechanism,*. in Thirteenth International Mineral Process Congress, 1981, Warsaw, Poland: Elsevier Polish Scientific Publishers, pp. 759-809.

Attia, Y.A. et al., *Cleaning and Desulfurization of High-Sulfur Coal by Selective Flocculation and Bioleaching in a Draft Tube Fluidized Bed Reactor*, Processing and Utilization of High Sulfur Coals IV, Elsevier Science Publishers, B.V., Amsterdam, 1991, pp. 769-790.

Ballester, A., et al., *The Use of Catalytic Ions in Bioleaching*Hydrometallurgy, 29(1992), pp. 145-160.

Bennett, J.W. et al., *Limitations of Pyrite Oxidation Rates in Dumps Set by Air Transport Mechanisms*, International Symposium of Biohydrometallurgy, pp. 551-561 (Warwick United Kingdom: Science and Technology Letters, 1987).

Berry, V.K., L.E. Murr, and J.B. Hiskey, *Galvanic Interaction Between Chalcopyrite and Pyrite During Bacterial Leaching of Low-Grade Waste*, Hydrometallurgy 3 (1978): pp. 309-326.

Biegler, T. and M.D. Home, *The Electrochemistry of Surface Oxidation of Chalcopyrite*, Journal of the Electrochemical Society: Electrochemical Science and Technology (1985), vol. 132, No. 6, pp. 1363-1369.

Boon, M. and J. Heijnen, *Gas-Liquid Mass Transfer Phenomena in Bio-Oxidation Experiments of Sulphide Minerals: A critical review of literature data.*, Hydrometallurgy, 48 (1998): pp. 187-204.

Boon, M. And J.J. Heijnen, *Mechanisms And Rate Limiting Steps In Bioleaching Of Sphalerite, Chalcopyrite And Pyrite With Thiobacillus Ferrooxidans*, Biohydrometallurgical Technologies, pp. 217-236 (Jackson Hole, Wyoming: The Minerals, Metals & Materials Society, 1993).

Brierley, Corale L. and Liguori, Albert J., *Copper Heap Leach Short Course Bio-Leaching Technology*, 1998 SME Annual Meeting & Exhibit, Mar. 9-11, 1998, Orlando, Fla, Tab 4.

Brierley, C., *Leaching Of Chalcopyrite Ore Using Sulfolobus Species*, Developments In Industrial Microbiology Proceedings Of The Thirty-Sixth General Meeting Of The Society For Industrial Microbiology, Aug. 11-17, 1979, Pittsburgh, Pennsylvania (1980), pp. 435-444.

Brierley, C. L., *Thermophilic Microorganisms in Extraction Of Metals From Ores*, Develop. Indust. Microbiol., Chapter 19, pp. 273-284 (1977).

Brierley, JA, and CL Brierley, *Microbial Leaching of Copper at Ambient and Elevated Temperatures*, in Metallurgical Applications for Bacteria Leaching and Related Microbiological Phenomena, pp. 477-490 (LE Murr, AE Torma and J.A. Brierley, ed., New York: Academic Press, 1978).

Brierley, JA, and CL Brierley, *Microbial Mining Using Thermophilic Microorganisms, in* Thermophiles: General, Molecular, and Applied Microbiology, pp. 279-305, (Thomas D Brock, ed., Golden: John Wiley & Sons, 1986).

Brock, T.D., et al., *Sulfolobus: A New Genus of Sulfur-Oxidating Bacteria Living at Low pH and High Temperature*, Arch. Mikrobiol., vol. 84: pp. 54-68 (1972).

Brown, J.B., *Jarosite goethite stabilities at 25° C. 1 atm*, Mineral. Deposita vol. 6, pp. 245-255 (1971).

Canfell, A., P. Greenfield, and D. Winborne , *Silver Catalysed Bioleaching of Chalcopyrite Ore in Columns, in IBS-Biomine'97*, M 5.1.1-5.1.10 (Sydney, Australia: Australian Mineral Foundation) (1997).

Chakraborti, N., and LE Murr, *Kinetics of Leaching Chalcopyrite-Bearing Waste Rock with Thermophilic and Mesophilic Bacteria*, Hydrometallurgy, 5 (1980): 337-354.

Devasia, P., K.A. Natarajan, and G.R. Rao, *Role of Bacterial Growth Conditions and Adhesion in the Bioleaching of Chalcopyrite by Thiobacillus Ferroxidans*, Minerals and Metall. Processing, May 1996 at 82-86.

Duarte, J.C. et al., *Semi-Conductor Reactor Studies of a High Temperature Copper Bioleaching Process*, Proceedings of the 6$^{th}$ European Congress in Biotechnology, pp. 1177-1180 (1994).

Dutrizac, J., *The Dissolution of Chalcopyrite in Ferric Sulfate and Ferric Chloride Media*, Met. Trans. B, vol. 12B, Jun. 1981, pp. 371-381.

Dutrizac, J., *Elemental Sulfur Formation During the Ferric Chloride Leaching of Chalcopyrite*, Hydrometallurgy, 23 (1990): 153-176.

Dutrizac, J.E., The Leaching of Sulphide Minerals in Chloride Media, Hydrometallurgy, 29 (1992): 1-45.

Escobar, B., et al., Bioleaching of a Copper Concentrate with Sulfolobus BC., in Biohydrometallurgical Technologies, pp. 195-204 (Jackson Hole, Wyoming: The Minerals, Metals & Materials Society) (1993).

Gomez, C., et al., Electrochemistry of Chalcopyrite, Hydrometallurgy, 43(1996): 331-344.

Harries, J.R. et al., Rate Controls on Leaching in Pyritic Mine Wastes, in Proceedings of International Symposium of Biohydrometallurgy, pp. 233-241 (Warwick United Kingdom: Science and Technology Letters) (1987).

Hiskey, J. Brent, *Overview of Cooper Heap Leaching*, 1998 SME Annual Meeting & Exhibit, Mar. 9-11, 1998, Orlando, Fla, Tab 1.

Huber, G. and K.O. Stetter, Sulfolobus Metallicus, sp. nov., a Novel Strictly Chemolithoautotrophic Thermophilic Archaeal Species of Metal-Mobilizers, System. Appl. Microbiol., vol. 14, pp. 372-378 (1991).

Johansson, C; Sharder, VI.; Suissa, J.; Adutwum, K.; Kohr, W.: "*Use of the GEOCOAT™Process for the Recovery of Copper from Chalcopyrite,*" published in the *Biohydrometallury and the Environment Toward the Mining of the 21$^{st}$ Century*: proceedings of the International Biohydrometallury Symposium, IBS '99, held in Madrid, Spain, Jun. 20-23, 1999, vol. 9, part A (1999).

Kelly, R., et al. Extremely Thermophilic Microorganisms: Metabolic Strategies, Genetic Characteristics, and Biotechnological Potential, in Biochemical Engineering V111, 1994, pp. 409-425.

Kordosky, Gary A., *Solvent Extraction of Metals: A Short Course*, 1998 SME Annual Meeting & Exhibit, Mar. 9-11, 1998, Orlando, Fla, Tab 11, pp. 1-36.

Le Roux, N E, and D S Wakerley. Leaching of Chalcopyrite (CuFeS2) at 70° C. Using Sulfolobus, in Proceedings of International Symposium of Biohydrometallurgy, pp. 305-318 (Warwick United Kingdom: Science and Technology Letters) (1987).

Madsen, B.W. and Groves, R.D., Percolation Leaching of a Chalcopyrite-Bearing Ore at Ambient and Elevated Temperatures with Bacteria, U.S. Bureau of Mines, Albany, OR, pp. 1-14 (Dec. 1983).

Marsh, R., P. Norris, and N. Le Roux, Growth and Mineral Oxidation Studies with Sulfolobu, in Recent Progress in Biohydrometallurgy, Cagliari, Italy, pp. 71-81 May 1983).

Mateos, F.B., I.P. Perez, and F.C. Mora, The Passivation of Chalcopyrite Subjected to Ferric Sulfate Leaching and Its Reactivation With Metal Sulfides. Hydrometallurgy 19 (1987):159-167.

Mehta, A.P. and L.E. Murr, Kinetic Study of Sulfide Leaching By Galvanic Interaction Between Chalcopyrite, Pyrite, and Sphalerite in the Presence of T Ferrooxidans (30° C.) and a Thermophilic Organism (55° C.), Biotech. Bioeng., vol. XXIV, pp. 919-940 (1982).

Mier, J. L., et al. Influence of Metallic Ions in the Bioleaching of Chalcopyrite by Sulfolobus BC: Experiments using pneumatically stirred reactors and massive samples, Minerals Engineering, vol. 8, No. 9, pp. 949-965 (1995).

Miller, P.C. and R. Winby, The Potential Commercialisation of Bioleaching for the Treatment of Chalcopyrite Ores and Concentrates, for presentation at the SME Annual Meeting, Denver, CO, Feb. 24-27, 1997 (SME Preprint No. 97-94).

Miller, P.C., Corrans, I.J., and Southwood, J., Bacterial Heap Leaching of Low-grade Nickel Material, Council for Mineral Technology, South Africa, pp. 341-352 (1985).

Muhtadi, Omar, *Heap Construction & Solution Application*, 1998 SME Annual Meeting & Exhibit, Mar. 9-11, 1998, Orlando, Fla, Tab 9.

Munoz, P.B., J.D. Miller, and M.E. Wadsworth, Reaction Mechanism for the Acid Ferric Sulfate Leaching of Chalcopyrite, Metall Trans. B, vol. 10B, Jun. 1979, pp. 149-158.

Murr, L.E. and Brierley, James A., *The Use of Large-Scale Test Facilities in Studies of the Role of Microorganisms in Commercial Leaching Operations*, in Metallurgical Applications of Bacterial Leaching and Related Microbiological Phenomena, pp. 491-520 (L.E. Muro, A.E. Torma and J.E. Brierley ed., New York Academic Press 1978).

Murr, L.E., and V.K. Berry, Observations of a Natural Thermophilic Microorganism in the Leaching of a Large, Experimental, Copper-Bearing Waste Body, Met. Trans. B, vol. 10B, Dec. 1979, pp. 523-531.

Norris, P.R. and L. Parrott, High Temperature, Mineral Concentrate Dissolution with Sulfolobus, in Fundamental and Applied Biohydrometallurgy, 1986, pp. 355-365.

Norris, P.R., Acidophilic Bacteria and Their Activity in Mineral Sulfide Oxidation, Microbial Mineral Recovery, pp. 3-27 (H.L. Ehrlich and C.L. Brierley ed., McGraw-Hill: New York 1990).

O'Malley, M. and K. Liddell, Leaching of $CuFeS_2$ by aqueous $FeCl_3$, HCl, and NaCl: Effects of solution composition and limited oxidant, in Metall. Trans. B, vol. 18B, Sep. 1987, pp. 505-510.

Pantelis, G. et al., Optimising Oxidation Rates in Heaps in Pyritic Materials, Biohydrometallurigical Technologies, The Minerals, Metals & Materials Society (1993), pp. 731-738.

Parker, A., R. Paul, and G. Power, Electrochemical Aspects of Leaching Copper from Chalcopyrite in Ferric and cupric salt solutions, Aust. J. Chem., vol. 34, 1981, pp. 13-34.

Parker, AJ, RL Paul, and GP Power, Electrochemistry of the Oxidative Leaching of Copper from Chalcopyrite., J. Electroanal. Chem. 118 (1981): 305-316.

Ritchie, A.I.M. et al., Optimisation of Oxidation Rates in Dump Oxidation of Pyrite-Gold Ores, Biomine '93 Conference, Mar. 22-23, 1993, Adelaide, Australia, pp. 9.1-9.8.

Shield, J.W. and R.M. Crowell, Heap Biooxidation of Sulfidic Gold Concentrates, in Randol Gold Forum '96, Olympic Valley California: Randol International Ltd., pp. 277-280 (1996).

Southwood, A.J., Miller, P.C., and Corrans, I.J., Parameters Affecting the Bacterial Heap Leaching of Low-Grade Niceliferous Material, XVth International Mineral Processing Congress (Jun. 1985), pp. 40-412.

Stetter, K., Hyperthermophiles: Isolation, Classification and Properties, in Extremophiles: Microbial Life in Extreme Environments, pp. 1-24, (K. Horikoshi and W. Grant ed., Wiley and Sons: New York 1998).

Wilson, J. and W. Fisher, Cupric Chloride Leaching of Chalcopyrite,. JOM, 1981, 33(2): pp. 52-57.

\* cited by examiner

HIGH TEMPERATURE HEAP BIOLEACHING PROCESS

The present application is a continuation of U.S. patent application Ser. No. 10/086,647, filed Feb. 28, 2002, now U.S. Pat. No. 6,802,888, which is a continuation of U.S. patent application Ser. No. 09/650,319, filed Aug. 29, 2000, now abandoned, which is a continuation-in-part of U.S. patent application Ser. No. 09/212,579, filed Dec. 14, 1998, now U.S. Pat. No. 6,110,253, all of which are hereby incorporated by reference as if fully set forth herein.

FIELD OF THE INVENTION

The present invention relates to the extraction of copper from hypogenic copper sulfide bearing ores and concentrates.

BACKGROUND

Hypogenic copper sulfides are an economically important sources of copper. Hypogenic deposits are formed by ascending solutions carrying high levels of metal ions at fairly high temperatures (up to 500° C.). As these solutions cool, metal sulfides are deposited as crystallized ore minerals as the solutions move up toward the Earth's surface. As a result, hypogenic deposits are characterized by metal sulfide bearing veins or irregular masses formed within fractures in the country rock. Within these hypogenic deposits, a variety of hypogenic copper sulfides may be found depending on the chemical composition of the ascending solution. Some of hypogenic copper sulfides found in hypogenic deposits are chalcopyrite, bornite, enargite, tetrahedrite, and tennatite. Hypogenic copper sulfides are also sometimes referred to as primary enriched copper sulfide minerals. The ascending solutions may also eventually reach the surface and appear as hot springs. In these situations, the solutions generally become diluted with ground water and thus have lower metal ion levels. As a result, the metal ions in these hot springs typically precipitate out as metal sulfate salts over time. In addition, the copper sulfide minerals that are formed above the water table may become altered over time by oxidation to sulfates by the circulation of air, water, and bacteria. These soluble metal salts are subsequently carried away in solution by the downward moving ground water. As the ground water moves to the oxygen deficient lower levels a secondary enrichment can take place. The copper-bearing solutions react with the existing chalcopyrite and other hypogenic sulfides such as bornite, enargite, tetrahedrite, and tennatite to form new copper sulfide minerals. The new minerals formed by the descending solutions are sometimes called supergenic or secondarily enriched copper sulfide minerals. The supergenic copper sulfides—or secondary enriched copper sulfides as they are sometimes referred to—are higher in copper and are characterized by the minerals covellite and chalcocite. They are also more readily oxidizeable copper sulfide minerals than the hypogenic copper sulfide minerals. These supergenic copper sulfide minerals are generally located below the oxidized zone and the water table and above the lower grade of primary sulfide ore.

Chalcopyrite is economically the most important hypogenic copper sulfide mineral, as well as the most economically important source of copper overall. Presently, smelting technology remains the primary technology for recovering copper from chalcopyrite. Smelting chalcopyrite, however, has a number of drawbacks. These include sulfur dioxide gas emissions which are environmentally unacceptable, large production of sulfuric acid even though there presently exist only a limited market for sulfuric acid in most areas, and expense. As a result, alternative methods for recovering copper from chalcopyrite, as well as other hypogenic copper sulfides, that are more environmentally friendly and less expensive have been sought for a number of years.

A number of alternatives that have been investigated for recovering copper from chalcopyrite and its ores have included hydrometallurgical processes. Hydrometallurgical processes have long been used to recover copper from oxide ores. These processes typically involve sulfuric acid leaching of the oxide ore, copper separation from the pregnant leach liquor by solvent extraction techniques and recovery of metallic copper from the strip liquor by electrowinning. These techniques have not only demonstrated an ability to recover copper at a competitive cost advantage over most smelting processes, but the electrowon copper produced in such processes is also now fully competitive in terms of quality with electrorefined copper produced by the known smelting and refining techniques. Presently, however, a commercially viable hydrometallurgical process for the recovery of copper from chalcopyrite, and other commercially important hypogenic copper sulfide minerals, has remained elusive despite extensive research efforts to develop such a process. The development of a hydrometallurgical process for the direct leaching of chalcopyrite either by chemical or biological means has been continuously sought for more than twenty years.

The direct leaching of chalcopyrite and other hypogenic copper sulfide minerals in sulfuric acid solution poses a variety of problems. At temperatures below the melting point of sulfur (approximately 118° C.), the rate of copper dissolution has, to date been uneconomically slow. At temperatures above the melting point of sulfur the chalcopyrite and other hypogenic copper sulfide minerals are passivated by what is believed to be a layer of elemental sulfur which forms over the unreacted sulfide particles. This again renders the extraction of copper uneconomical by this process. Other leaching systems that have been studied over the years for the extraction of copper from chalcopyrite on laboratory or pilot scale include systems employing concentrated solutions of ferric chloride or ammoniacal ammonium as lixiviants.

Efforts to bioleach chalcopyrite and other hypogenic copper sulfides on a commercial scale have also proven unsuccessful to date. Hypogenic copper sulfides such as chalcopyrite are notoriously difficult to bioleach even though bioleaching is now used as the principal production approach to extract copper from supergenic copper sulfide minerals such as chalcocite and covellite at several mining operations around the world.

Stirred tank and heap biooxidation processes that have employed mesophiles, such as *Thiobacillus ferrooxidans*, the most commonly used microorganism for biooxidizing sulfide minerals, have largely been unsuccessful due to the slow leach kinetics of chalcopyrite and other hypogenic copper sulfides. The slow leach kinetics and incomplete biooxidation of chalcopyrite and other hypogenic copper sulfides are often attributed to the formation of an inhibiting or passivation layer that forms on the surface of these copper sulfides as they oxidize. A number of different additives have been used in an attempt to increase the dissolution of copper from chalcopyrite, presumably by disrupting the passivating layer. These additives include metal salts such as $Ag_2SO_4$, $Bi(NO_3)$, graphite, and other sulfide minerals. Any biohydrometallurgical process for treating hypogenic copper sulfides such as chalcopyrite, therefore, will have to address the problem of this surface layer. Studies of the problem have led to several theories concerning the nature of the inhibiting layer.

One theory is that a jarosite coating forms on the surface of hypogenic copper sulfides as they are leached. Jarosite is formed in the presence of sulfate and ferric iron, in environments in which the pH increases to above about 1.8. However, high concentrations of jarosite constituent molecules (sulfate, ferric iron, ammonium or potassium) will lead to jarosite formation at lower pH. The presence of jarosite in analysis of bioleached chalcopyrite supports this theory. However, experiments performed by the present inventors that show slow leaching even at low constituent molecule concentration and low pH, as well as reports in the literature, contradict this theory.

Another theory is that elemental sulfur produced during bioleaching forms a thick blanket that excludes bacteria and chemical oxidants from the surface of the hypogenic copper sulfide minerals. The detection of large amounts of sulfur in bioleached chalcopyrite supports this theory. In addition, many electron micrographs have shown a thick sulfur coating on leached chalcopyrite. This theory, however, does not adequately explain why other metal sulfides that also form sulfur when leached do not leach as slow as chalcopyrite.

A third theory proposes that the inhibition is caused by the formation of an intermediate sulfide passivation layer. It is believed that this passivation layer is less reactive than the original hypogenic copper sulfide and may also inhibit the flow of electrons and oxidants to and from the hypogenic copper sulfide. The exact nature of this passivation layer is complex and is the subject of scientific debate. However, there is good agreement among the data in the literature that the passivation layer is unstable at higher temperatures. For example, it has been found that temperatures above about 60° C. are high enough to minimize the passivation of chalcopyrite during leaching.

Experiments with leaching at higher temperatures by both chemical and biological means have shown accelerated leaching of chalcopyrite. Chemical leaching done at over 100° C., however, requires expensive pressure reactors. Biological leaching is limited to the temperature limits of microorganisms that are capable of oxidizing metal sulfides or oxidizing ferrous to ferric. Some examples of microorganisms capable of oxidizing ferrous, metal sulfides, and elemental sulfur in environments above 60° C. include: *Acidianus brierleyi, Acidianus infernus, Metallosphaera sedula, Sulfolobus acidocaldarius, Sulfolobus BC,* and *Sulfolobus metallicus*. However, there are also other extreme thermophiles that can grow and leach metal sulfides at temperatures above about 60° C.

Stirred tank processes utilizing thermophiles have resulted in faster bioleaching of chalcopyrite than those using mesophiles have or moderate thermophiles have. Indeed, various microorganisms have been used in stirred tank processes to leach chalcopyrite concentrate in less than 10 days leaching time. However, the high temperature required for rapid leaching of chalcopyrite, as well as other hypogenic copper sulfides, increases the mass transfer limitations of oxygen and carbon dioxide in the system. This in turn has placed severe limitations on the pulp density that can be used in these stirred tank processes due to the high oxygen requirements of the thermophiles and the oxidation reaction occurring on the surface of the chalcopyrite during leaching. Thus, even though the bioleaching process can be completed in less than 10 days in a stirred tank process, the high operating and capital costs associated with operating a plant at the low pulp densities necessary to satisfy the oxygen requirements of the system have prevented the commercial implementation of stirred tank bioleaching for chalcopyrite concentrates, as well as for concentrates of other hypogenic copper sulfides.

If an effective heap bioleaching process could be developed for hypogenic copper sulfides, such as chalcopyrite, it would have the potential of operating at a lower cost than tank bioleaching of concentrate or pressure leaching of either concentrate or ores of hypogenic copper sulfides. Thus, heap leaching of hypogenic copper sulfides would be the preferred low cost procedure if a process could be developed to extract a high percentage of the copper in a matter of months. The use of thermophiles in a pilot scale heap leaching process is reported in Madsen, B. and Groves, R., *Percolation Leaching of a Chalcopyrite-Bearing Ore at Ambient and Elevated Temperatures with Bacteria*, 1983, Bureau of Mines. However, the process described in this paper was unable to achieve satisfactory recoveries in a reasonably short period of time and thus is not commercially viable. There have also been other reports of heap bioleaching processes reaching temperatures above 60° C. However, these too have not been commercially viable for extracting copper from chalcopyrite ores. The failings of all the reported heap bioleaching processes for chalcopyrite ores is that they have all generally taken over one year to leach and recover less than 50% of the copper in the chalcopyrite. The reasons for this are not entirely clear. However, the present inventors have determined that there are several factors that have acted together to prevent successful heap bioleaching of chalcopyrite ore. The first is that the heaps that have eventually reached a temperature of 60° C. or higher have taken a long time to build up enough heat to reach such high temperatures. As a result, once a temperature of 60° C. is reached, the amount of exposed sulfide mineral particles in the heap is insufficient to maintain the temperature to complete copper leaching. Furthermore, in the case of larger ore particles, such as those over about 2.5 cm, not enough of the copper sulfides in the ore are exposed to the leaching solution to permit adequate recoveries. Finally, the high temperatures can also increase the amount of ferric ion that precipitates as jarosite, which can further slow the leaching.

SUMMARY OF THE INVENTION

The present invention is directed to a high temperature bioleaching process for extracting copper from hypogenic copper sulfide bearing ores. More particularly, the present invention is directed to providing a high temperature bioleaching process for extracting at least 50% of the copper from a heap comprising hypogenic copper sulfide bearing ore in a period of about 210 days or less.

As used herein, hypogenic copper sulfide bearing ores will be understood to refer to crushed ores, tailings and concentrates containing one or more hypogenic copper sulfide minerals, such as chalcopyrite, bornite, enargite, tetrahedrite, and tennatite. Chalcopyrite ores will be understood to refer to crushed ores, tailings, and concentrates containing chalcopyrite.

A process according to one aspect of the present invention for extracting copper from hypogenic copper sulfide bearing ores comprises the steps of: a.) constructing a heap comprising hypogenic copper sulfide bearing ore, the heap including exposed sulfide mineral particles at least 25 weight % of which comprise hypogenic copper sulfides, wherein the concentration of exposed sulfide mineral particles in the heap is such that the heap contains at least 10 Kg of exposed sulfide sulfur per tonne of solids in the heap, and wherein at least 50% of the total copper in the heap is in the form of hypogenic copper sulfides; b.) heating a substantial portion of the heap to a temperature of at least 50° C.; c.) inoculating the heap with a culture comprising at least one thermophilic microorganism capable of biooxidizing sulfide minerals at a temperature above 50° C.; d.) irrigating the heap with a process leach solution comprising sulfuric acid and ferric iron; e) bioleaching sufficient sulfide mineral particles in the heap to oxidize at least 10 Kg of sulfide sulfur per tonne of solids in the heap and to cause the dissolution of at least 50% of the copper in the heap into the process leach solution in a period of 210 days or less from completion of the heap; and f.) collecting a pregnant process leach solution that contains dissolved copper as it drains from said heap.

Preferably, a substantial majority of the heat required to initially heat the heap to temperature and to maintain the heap at temperature is derived from the bioleaching of sulfide minerals contained within the heap.

In another aspect of the present invention, a high temperature heap bioleaching process for recovering copper from hypogenic copper sulfide bearing ores is provided. The process according to this aspect of the invention comprises the steps of: a.) constructing a heap comprising hypogenic copper sulfide bearing ore, the heap including exposed sulfide mineral particles at least 25 weight % of which comprise hypogenic copper sulfides, wherein the concentration of exposed sulfide minerals in the heap is such that the heap includes at least 10 Kg of exposed sulfide sulfur per tonne of solids in the heap, and wherein at least 50% of the total copper in the heap is in the form of hypogenic copper sulfides; b.) heating at least 50% of the heap to a temperature of at least 60° C.; c.) maintaining at least 50% of the heap at a temperature of at least 60° C. until at least 50% of the copper in the heap is dissolved; d.) inoculating the heap with a culture comprising at least one thermophilic microorganism capable of bioleaching sulfide minerals at a temperature above 60° C.; e.) irrigating the heap with a process leach solution at a rate of at least 72 liters/m²/day; f.) bioleaching sulfide mineral particles in the heap, wherein sufficient sulfide minerals are oxidized in a bioleaching period of 210 days or less to oxidize at least 10 Kg of sulfide sulfur per tonne of solids in the heap and cause the dissolution of at least 50% of the copper in the heap into the process leach solution; g.) collecting a pregnant process leach solution that includes copper cations as it drains from the heap during the bioleaching period; and h.) recovering copper from the pregnant process leach solution.

The above aspects and other objects, features and advantages of the present invention will become apparent to those skilled in the art from the following description of the preferred embodiments taken together with the accompanying figures.

DETAILED DESCRIPTION OF THE PREFERRED EMBODIMENTS

Figure 1:
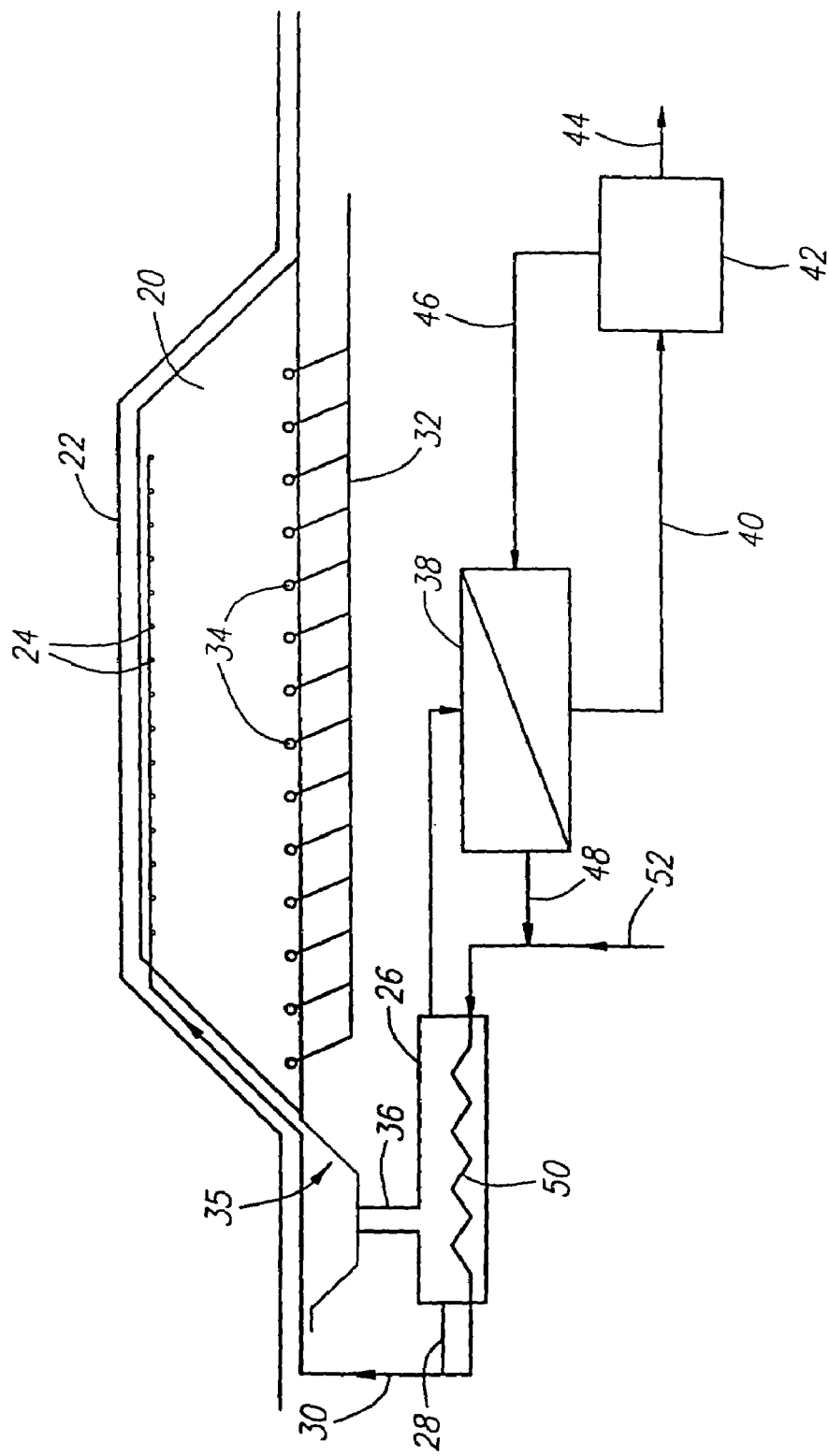
FIG. 1 is a schematic illustration of a process flow chart according to one embodiment of the present invention.

The present invention improves the heap bioleaching of hypogenic copper sulfides by providing a method of accelerating the rate of bioleaching in the heap and increasing the percentage of copper leached from the heap. The introduction of an adequate fuel value into the heap during the heaps' construction is an important aspect of the high temperature heap bioleaching process of the present invention. The fuel component can be in the form of hypogenic copper suflides, pyrite, supergenic copper sulfides and other sulfide minerals that generate a large amount of heat energy when biooxidized. Hypogenic copper sulfides that may be included in the heap include, for example, chalcopyrite, bornite, enargite, tetrahedrite, and tennatite. Supergenic copper sulfides that may be included in the heap include, for example, chalcocite and covellite.

The heat is generated by the exothermic oxidation reactions that occur during biooxidation of these fuel values. A significant portion of the sulfide fuel material, therefore, must be exposed to the air, water, and biooxidizing microorganisms or ferric ion within the heap to ensure that an adequate amount of heat can be generated in a sufficiently short period of time to supply a substantial portion of the heat required to maintain the heap at a temperature above about 50° C. while the hypogenic copper sulfides in the heap are bioleached.

If sufficient fuel values are not present, the heap cannot be maintained at a temperature above 50° C. while biooxidation of the hypogenic copper sulfides proceeds without providing substantial amounts of heat from an external source, which would make the process economically prohibitive. The process will typically be economical if the exposed sulfide minerals in the heap, that is those sulfide mineral particles that can be biooxidized in a period of about 210 days or less, contain at least 10 Kg of sulfide sulfur per tonne of solids in the heap. In other words, the heap should contain at least 10 Kg of exposed sulfide sulfur per tonne of solids in the heap. This concentration of sulfide sulfur translates to a heat value of approximately 50,000 Kcal/tonne of solids upon oxidation. This is based on the fact that the standard free energy change for the oxidation of pyrite by the reaction in accordance with equation (1):

$$FeS_2 + 3.5O_2 + H_2O \rightarrow Fe^{2+} + 2SO_4^{2-} + 2H^+ \tag{1}$$

is approximately 1440 KJ. Furthermore, although the standard free energy change for the various other sulfide minerals is different, because the heat of formation of each mole of $SO_4^{2-}$ accounts for the majority of the change in standard free energy for all of these reactions, one can assume that the change in standard free energy for the oxidation reactions of the other sulfide minerals is approximately the same. It can be assumed, therefore, that for each mole of $S_2$ oxidized, approximately 1440 KJ of energy will be released. Thus, if a heap contains 1% by weight sulfur in exposed sulfide minerals, or 10 Kg of exposed sulfide sulfur per tonne of solids, it contains a potentially useful fuel value of approximately 50,000 Kcal per tonne of solids in the heap.

Obviously the higher the concentration of exposed sulfide minerals contained within the heap the greater the potentially useful fuel value of the heap will be and the less heat that will need to be supplied by an external source. If the concentration of exposed sulfide minerals in the heap is sufficiently high, the fuel component of the heap will be such that the heat generated upon oxidation will be sufficient to heat the heap to a temperature above 50° C. and to maintain the heap above 50° C. while biooxidation of the hypogenic copper sulfides proceeds.

A high temperature heap bioleaching process for extracting copper from hypogenic copper sulfide bearing ore according to the present invention is schematically illustrated in FIG. 1. According to the process, a heap 20 is constructed with a hypogenic copper sulfide bearing ore, such as a chalcopyrite bearing ore. It is desirable for heap 20 to be at least 2.5 m high and at least 5 m wide so that the outer extremities of the heap will help insulate the inner portions of the heap. Typically heap 20 will have larger dimensions to make the processes as economical as possible. For example, heap 20 will typically have a height of at least 3 m and a width of at least 10 m. The length of heap 20 will typically depend on the limitations of the site on which the heap is constructed, but generally heap 20 will be substantially longer than it is wide.

Although the foregoing dimensions have been provided as guidelines, those skilled in the art will recognize that the dimensions of heap 20 can vary significantly. Furthermore, the heap does not have to be rectangular as illustrated in FIG. 1, but can also be circular or any other shape desired or perhaps required by the limitations of the site at which the process will be carried out.

When completed, heap 20 will generally contain at least 4% by weight water. Preferably heap 20 will include 7% or more water by weight. However, the more water contained within heap 20, the greater the amount of heat required to heat heap 20 to a temperature above about 50° C. where active biooxidation of the hypogenic copper sulfides in the heap begins. For example, a heap that contains 7% water by weight will take approximately 3,500 Kcal of heat to heat the water in the heap from 20° C. to 70° C. for each tonne of solids in the heap. Whereas a heap that contains 10% water by weight will take approximately 5,000 Kcal of heat to heat the water in the heap from 20° C. to 70° C. for each tonne of solids in the heap. Moreover, the specific heat of water is greater than that of ore. Thus, it is desirable to maintain the water content of the initial heap at a level that does not exceed about 15% water by weight of solids in the heap. Water can be added to the heap during formation of the heap or following completion of the heap while conditioning it in preparation for the bioleaching process.

As noted above, heap 20 must also include exposed sulfide mineral particles. The concentration of exposed sulfide mineral particles in heap 20 must be such that the heap includes at least 10 Kg of exposed sulfide sulfur per tonne of solids in the heap. To improve the performance of the present process, however, the concentration of exposed sulfide mineral particles is preferably such that the heap will contain at least 30 Kg of exposed sulfide sulfur per tonne of solids in the heap. With appropriate heap design considerations, as will be discussed in more detail below, the concentration of exposed sulfide sulfur can reach levels of 40 to 90 Kg per tonne of solids in the heap or even higher. Thus, even more preferably the concentration of exposed sulfide sulfur is at least about 45 Kg per tonne of solids.

As used herein, exposed sulfide mineral particles will be understood to be those sulfide mineral particles that are exposed to the air, water, and biooxidizing microorganisms or ferric ions within the heap so that they can generally be biooxidized within a period of 210 days or less. The sulfide sulfur in these exposed sulfide mineral particles is referred to as exposed sulfide sulfur for purposes of the present application to distinguish it from other sulfide sulfur that may be in the heap but due to its occlusion, in gangue material for example, its fuel value is not available to the heap in a reasonable biooxidation period of 210 days or less.

Typically the majority of the exposed sulfide mineral particles within the preferred heap designs of the present invention will be finely ground and have a particle size of 250 μm or less, and preferably a particle size of less than about 107 μm. However, exposed sulfide mineral particles can also be present in larger ore particles that may be found in the heap. This is because some fraction of the sulfide mineral particles contained within larger ore particles will typically reside on the surface, or close enough to the surface, of the ore particles to permit access of the necessary components for oxidation to occur, namely air, water, and biooxidizing bacteria or ferric ions, within a period of about 210 days or less. As those skilled in the art will appreciate, finer ore particles will typically have more exposed sulfide mineral particles than coarser ore particles.

While the exposed sulfide mineral particles in the heaps of the present invention will typically include a variety of sulfide minerals. A minimum of about 25 weight % of the exposed sulfide mineral particles in the heap should comprise one or more hypogenic copper sulfides. Desirably, at least 25 weight % of the exposed sulfide mineral particles in the heap is in the form of chalcopyrite. More preferably the hypogenic copper sulfide fraction of the sulfide mineral particles in the heap is in the range of about 30 to 70 weight %. The remainder of the sulfide mineral particles within heap 20 preferably comprises more readily biooxidizeable sulfide minerals such as pyrite, arsenopyrite, and supergenic copper sulfides, such as chalcocite, and covellite. These less recalcitrant sulfide minerals provide an important fuel component to the heap, which may be used to heat heap 20 up to temperature and help maintain the heap at temperature while biooxidation of the chalcopyrite and/or other hypogenic copper sulfides proceeds. The presence of these other less recalcitrant sulfide minerals is also desirable because they increase the galvanic leaching of the chalcopyrite and other hypogenic copper sulfides in the heap. Thus, in constructing the heaps of the present invention, it is desirable for at least a portion of the exposed sulfide mineral particles to comprise one or more less recalcitrant sulfide minerals such as pyrite, arsenopyrite, covellite, and chalcocite. The invention, however, can be practiced with up to 100% of the sulfide minerals in the heap being one or more hypogenic copper sulfides, such as chalcopyrite, bornite, enargite, tetrahedrite, and tennatite.

Because supergenic copper sulfide minerals such as chalcocite and covellite can be readily bioleached using mesophiles such as *Thiobacillus ferrooxidans* the present high temperature process is not as economically justified for processing these copper sulfide minerals alone. Accordingly, at least 50% of the copper in heap 20 should be in the form of one or more hypogenic copper sulfides, such as chalcopyrite, so that hypogenic copper sulfide minerals are the primary source of copper in the heap. Preferably at least 80 to 90% of the copper in the heap is in the form of one or more hypogenic copper sulfides to maximize the amount of recalcitrant copper sulfide mineral material that is being processed in the heap and thus the economic benefit of practicing the present invention.

Heap 20 may be produced using any of the techniques known in the art for producing heaps for leaching so long as the above parameters are satisfied for the completed heap. By way of example, the heap may be constructed by stacking run-of-the-mine ore to form a heap. Preferably, however, the ore is crushed to a particle size of 90% passing 2.54 cm. Alternatively, the crushed ore may be agglomerated prior to stacking to improve air and liquid flow within the heap as is known in the art. Furthermore, a sulfide mineral concentrate may be added to the heap to increase the potentially useful fuel value of the heap.

A preferred method for forming heap 20 is described in U.S. Pat. No. 5,766,930, which is hereby incorporated by reference as if fully set forth herein. U.S. Pat. No. 5,766,930 describes the construction and operation of large surface bioreactors that are particularly well suited for practicing the present invention.

Thus, for example, heap 20 may be constructed by crushing a hypogenic copper sulfide hearing ore that is to be bioleached, such as a run-of-the-mine chalcopyrite bearing ore, to a particle size that is less than 2.54 cm, and preferably less than 12.7 mm. The fines fraction, for example the fraction that is less than about 3 mm, is then removed to ensure adequate air flow within the final heap. The plurality of crushed coarse ore particles are then coated with a concentrate of sulfide minerals having a particle size of less than 250 μm, and preferably less than about 107 μm. The concentrate comprises at least one hypogenic copper sulfide mineral such as chalcopyrite. In addition, the concentrate also preferably contains one ore more less recalcitrant sulfide minerals such as pyrite, arsenopyrite, chalcocite, and covellite. As described above, however, because all of the sulfide mineral particles in the concentrate are considered exposed sulfide mineral particles, at least 25 weight % of the total sulfide mineral content in the concentrate should be in the form of one or more hypogenic copper sulfides. It is desirable, however, for at least 25 weight % of the total sulfide mineral content in the concentrate to be in the form of chalcopyrite.

The concentrate may be coated onto the substrates using a variety of techniques, including the use of a rolling drum or a slurry sprayer. The thickness of the concentrate coating on the coarse ore is preferably less than 1 mm to ensure that the microorganisms being used in the bioleaching process have adequate access to all of the sulfide mineral particles in the concentrate. Thicker coatings will increase the capacity of the heap bioreactor, but the rate at which the bioleaching process advances will likely be slowed due to decreased access of the microorganisms being used to the underlying sulfide mineral particles in the concentrate. To make full use of the capacity of the heap bioreactor while ensuring adequate microorganism access, the thickness of the concentrate coating should be greater than about 0.5 mm and less than about 1 mm. This will generally translate to a concentrate loading of approximately 9 to 30 weight percent. Typically the concentrate loading on coarse ore will be about 10 to 15% of the weight of the coarse ore substrates. This is generally enough, however, to create the heat necessary to raise the temperature of the heap up to the temperature optimum for the extreme thermophiles capable of oxidizing iron and bioleaching hypogenic copper sulfide minerals, such as chalcopyrite, at temperatures above 50° C.

By coating the coarse ore with about ten weight percent of a chalcopyrite, or other hypogenic copper sulfide concentrate, the coated ore will typically include at least 30 Kg of exposed sulfide sulfur per tonne of ore. It will be appreciated by those skilled in the art, therefore, that the coarse ore should be coated with as much concentrate as possible and the concentrate should include as much sulfide minerals as possible to maximize the amount of exposed sulfide mineral particles in the completed heap. For example, if a typical concentrate that contains at least 30 weight % sulfide sulfur is coated onto the coarse ore at a loading of 10 weight %, the concentrate coated ore will contain at least 3% exposed sulfide sulfur, which translates to a potential fuel value of approximately 150,000 Kcal/tonne or ore. On the other hand, if 15 weight % of the concentrate is coated onto the coarse ore support than the heap will contain at least 4.5% exposed sulfide sulfur, which has a fuel value of approximately 225,000 Kcal/tonne of ore. Finally, if 30 weight percent concentrate can be coated onto the coarse ore substrates, the heap will contain at least 9% exposed sulfide sulfur, a fuel value of approximately 450,000 Kcal/tonne of ore.

The use of uniformly coated coarse ore substrates that have a maximum particle size of 2.5 cm, and preferably less than 12.7 mm, ensures adequate exposure of the chalcopyrite mineral in the coarse ore support material to the oxidizing solutions containing ferric and cupric ions and to the microorganisms capable of converting ferrous ions to ferric ions that aid in the leaching process. Use of coarse support ore that is smaller than 2.5 cm and larger than 3.0 mm also results in a heap design that permits adequate loading of fuel values in the form of a sulfide mineral concentrate into the heap while ensuring adequate liquid and air flow within the heap and exposure of the sulfide mineral concentrate to the oxidizing environment of the heap. Therefore, when the concentrate coated coarse ore particles having the above characteristics are stacked to form a heap they provide a very large surface area bioreactor that is very efficient in terms of bioleaching the coated concentrate. Most of the highly exposed sulfide minerals in the concentrate will generally biooxidize in 30 to 90 days. However, in the case of the most recalcitrant mineral sulfides such as chalcopyrite and other hypogenic copper sulfides, the leaching may be much slower in comparison.

The concentrate of sulfide mineral particles may be produced from the fines generated by crushing the hypogenic copper sulfide ore to a size less than 2.5 cm. Typically this will be the portion of the ore that is less than about 3.0 mm. The sulfide mineral particles in this fines fraction can be concentrated from the remainder of the fines by flotation or gravity separation or by a variety of other methods recognized by those skilled in the art. Removing the minus 3.0 mm fraction of the ore is beneficial because if too many fines are present in the heap they can limit the flow of liquid and air within the heap. The fine ore could also consume unacceptable amounts of acid and thus lead to higher pH levels in the heap and more jarosite and ferric precipitation.

In addition to using the hypogenic copper sulfide concentrate produced from the fines fraction of the ore, the coarse ore particles may be coated with hypogenic copper sulfide concentrates produced from other copper bearing ores. It also may be beneficial to mix in concentrates of other sulfide minerals with the hypogenic copper sulfide concentrate for the reasons described above.

Chalcopyrite concentrates made for the smelting process are generally separated from other sulfide minerals such as pyrite. The separation process can be a variety of methods recognized by those skilled in the art of mineral processing. The general purpose of this separation is to achieve high copper content for the economical smelting of the concentrate. Concentrates that are high in pyrite, and therefore, lower in copper are less economical to process by smelting. The separation processes used to achieve high concentrations of copper, however, increase the cost of producing copper. They also lower the overall recovery of copper. This is because the higher the concentration of copper one tries to achieve in the concentrate, the more copper that will necessarily be lost to the tails of the separation process.

An advantage of the high temperature heap bioleaching process of the present invention, therefore, is that the concentrate added to the heap need not be as high a percentage of copper as is required for economical smelting. As described above, the presence of pyrite can accelerate the leaching of the hypogenic copper sulfides, such as chalcopyrite, in the treated ore through galvanic interactions. Moreover, the biooxidation of pyrite in the heap also provides a source of heat that can help raise and maintain the temperature of the heap in a range of 60 to 80° C., which in turn will promote the growth of extreme thermophiles and the faster leaching of hypogenic copper sulfides. Therefore, greater overall copper recoveries from a hypogenic copper sulfide ore body, such as a chalcopyrite ore body, can be realized with the present invention while simultaneously realizing a cost savings from not having to produce as high a grade of concentrate.

Although the heap has been described above as being constructed using coarse ore particles as support, other materials may also be used as support for the concentrate in the present invention. For example, the coarse support material may be selected from the group consisting of rock, brick, slag, and plastic. The coarse support may also comprise coarse ceramic particles. If the support ore is rock, as those skilled in the art will appreciate, a variety of rocks can be used for the coarse support, including lava rock, barren rock, and crushed copper ore.

An advantage of using coarse chalcopyrite or other hypogenic copper sulfide ore particles as the support material is that the hypogenic copper sulfides contained within this support material can be at least partially biooxidized during the process. Furthermore, the coarse support material can be recycled a number of times through the process by removing the biooxidized concentrate and recoating it with fresh concentrate, thereby resulting in even higher recoveries of copper from the coarse support.

In addition, after the coarse ore support is processed through the process one or more times, it can be ground and the remaining sulfide minerals contained therein separated using known techniques in the art to form a sulfide mineral concentrate. This concentrate can then be combined with other concentrate for coating on coarse ore support material and processing according to the invention.

Barren rock, such as granite, that contains a small amount of carbonate may be beneficial in helping suppress the amount of iron removed in the pregnant leach liquor. As the carbonate mineral in the rock reacts with the acid in the process leach solution, it causes local pH increases resulting in the precipitation of iron. As a result, the concentration of copper in the final pregnant leach liquor collected from the heap and sent to the solvent extraction plant for copper recovery may be able to be increased. This is due to the fact that solvent extraction plants can typically only handle a maximum concentration of about 5 g/l iron in the pregnant leach liquor before special treatments must be performed to selectively remove the iron. Thus, without the precipitation effect caused by the carbonate mineral in the support rock, the pregnant leach liquor must have lower concentrations of copper than otherwise might be possible to ensure that the iron concentration does not exceed the limits of the solvent extraction plant.

Another preferred heap design for practicing the present invention is described in U.S. Pat. No. 5,431,717, which is hereby incorporated by reference. In accordance with this patent, a heap may be constructed by removing all of the fine material from the hypogenic copper sulfide ore, for example that fraction of ore that is less than about 0.3 cm, and then adding a hypogenic copper sulfide bearing concentrate to the heap. This can be accomplished by distributing the concentrate on the top of the heap so that it migrates down through the heap during bioleaching or simply mixing it in with the remainder of the ore during heap formation without necessarily producing a uniform coating of the concentrate on the coarse ore prior to heap formation.

To fully utilize the heat generated from the exothermic oxidation reactions that will occur during biooxidation, the heap should be constructed in such a way to hold in as much heat as possible but also allow for the control of temperature so that the temperature optimum for the biooxidizing microorganisms is not exceeded. This can be accomplished by covering the heap with an insulating barrier layer 22 to hold in heat and water vapor. Insulating barrier layer 22 may be a tarp, plastic sheets, fiberglass insulation, a layer of crushed rock, or any of the other insulating barriers known in the art. In the case of operations in cold climates it may be preferred that the heap be built within an insulated walled enclosure to aid in maintaining the heat.

In addition to covering the heap, the flow of process leach solution from emitters 24 down through the heap will transport heat from the top of the heap to the bottom of the heap. The movement of air up through the heap will transport heat up through the ore. Therefore, if both the flow of liquid and air can be controlled separately, the heat generated from the process can be moved out of the heap either through the top of the heap in the form of water vapor or through the bottom of the heap in the form of hot liquid. Alternatively, the heat of reaction can be held within the heap by balancing the flow of liquid and air.

The heap preferably contains one or more temperature monitoring devices such as a thermocouple so that the temperature profile of the heap can be continuously monitored. The placement of several thermocouples throughout the heap would be preferred to best control the temperature of the heap.

After the heap is constructed, a substantial portion of the heap needs to be heated to a temperature of at least 50° C., preferably at least 60° C. and even more preferably at least 70° C. The higher the temperature of heap 20, the faster the biooxidation of the hypogenic copper sulfides, such as chalcopyrite, will proceed. By substantial it is meant that ultimately at least 50%, of the heap should reach a temperature at or above the target temperature. Preferably at least 80% of the heap will reach a temperature above the target temperature to maximize the recovery of copper from the heap and the recovery rate.

Heap 20 should be heated to temperature as quickly as possible. This will help ensure that sufficient exposed sulfide minerals remain in the heap once it reaches temperature to supply the majority, if not all, of the heat necessary to maintain the heap at temperature throughout the high temperature biooxidation of the hypogenic copper sulfides in the heap. Typically heating the heap to temperature within a period of 45 days will be adequate to satisfy this goal. However, heap 20 is preferably heated to temperature within a period of 30 days or less to minimize the total time for the process to be carried out and to maximize the concentration of exposed fuel values remaining in the heap for bioleaching the hypogenic copper sulfides in the heap. As the amount of heat lost from heap 20 is time dependent, increasing heap 20 to temperature as quickly as possible will also help minimize the amount of heat lost from the heap during the biooxidation process.

The heap may be heated to temperature by a variety of methods. In the event of heap leaching operations in a cold climate or when insufficient exposed sulfide minerals are available to add to the heap, an external source of heat such as hot liquid, steam or hot air may be added to the heap to start the process or to maintain the optimal temperature. For example, heated process leach solution may be pumped from reservoirs 26 to the top of heap 22 through process leach solution supply lines 28 and 30. The process leach solution is then distributed over the top of heap 20 through pressure emitters 24. Other means of distributing process leach solution that are known in the art may also be used, including bagdad wigglers, sprinklers, wobblers, and flooding. The advantage of pressure emitters is that the amount of water lost due to evaporation is minimized. Furthermore, the portion of supply line 30 that runs along the top of the heap may be buried to further reduce evaporation and improve the insulation of supply line 30 in situations where the process leach solution may be heated.

Alternatively, heap 20 may also be heated by pumping steam or hot air through steam or hot air supply line 32 to perforated distribution pipes 34 buried in the bottom of the heap. Supply line 32 and perforated distribution pipes 34 may also supply ambient air for purposes of increasing the oxygen and nitrogen levels in the heap as well as to remove heat from heap 20 should it become overheated.

The heap must be inoculated with a culture including at least one thermophilic microorganism capable of bioleaching sulfide minerals at a temperature above 50° C., and preferably above 60° C. This may occur before or after the heap reaches temperature, or at any time during the bioleaching process to increase the amount of thermophilic microorganisms in the heap.

A process leach solution is also applied to the heap during the bioleaching step, typically at a rate of at least 72 l/m²/day. The process leach solution helps maintain the appropriate conditions within the heap for bioleaching the sulfide minerals and carries away the soluble biooxidation products. In particular, as the copper sulfide minerals are biooxidized, the copper from these minerals is dissolved into the process leach solution, forming a pregnant process leach solution.

Once a portion of the heap reaches at least 50° C., the thermophilic microorganisms in that portion of the heap will become active and begin to rapidly bioleach the exposed hypogenic copper sulfide minerals and other sulfide minerals in that region of the heap. This will produce additional heat which in turn will help increase the temperature of surrounding regions in the heap to above 50° C. until ultimately a substantial portion of the heap is above 50° C., and preferably above 60° C. The actual amount of the heap that is heated above the desired temperature will depend on the rate at which heat is input into the heap through the oxidation of sulfide minerals and through other heat additions to the heap, and the rate at which heat is lost from the heap through convection and radiation.

If bioleaching is carried out so that at least 10 Kg of the sulfide sulfur per tonne of solids in the heap is oxidized in a period of 210 days or less from completion of the heap, a significant fraction of the heat required to maintain the heap at temperature while bioleaching the hypogenic copper sulfides in the heap may be obtained from the exothermic oxidation reactions occurring within the heap. Furthermore, by having sufficient exposed sulfide mineral particles within the heap as described above, it is possible to bioleach at least 50% of the copper sulfide minerals in the heap and thereby cause at least 50% of the copper in the heap to dissolve into the process leach solution within a 210 day period from completion of the heap. In appropriately designed heaps, it will be possible to extract at least 70%, and preferably over 80%, of the total copper in a period of 210 days or less. Indeed, if a sufficient concentration of the hypogenic copper sulfides in the heap are found in particles having a size of less than 250 µm, and preferably less than about 107 µm, it will be possible to achieve recoveries of over 80 or 90% in a about 90 to 100 days.

The use of thermophilic chemolithotrophic microorganisms that biooxidize hypogenic copper sulfide minerals, as well as other sulfide minerals, make it possible to operate the heap at temperatures above about 60° C. and speed up the biooxidation rate of the hypogenic copper sulfides in the heap. These microorganisms are defined as those that live at temperatures in excess of about 60° C., derive their energy from inorganic elements, such as iron and sulfur, and obtain their carbon from carbon dioxide fixation. These organisms, represented by such genera as *Sulfolobus, Acidianus,* and *Metallosphaera*, are actually Archaea, but are frequently referred to as bacteria in the literature.

Because thermophilic microorganisms are capable of thriving on mineral sulfides in high temperature environments, these microorganisms are ideally suited for the process of the present invention, which requires the use of high temperature heap leaching and may employ heap designs with high concentrations of sulfide minerals that result in large amounts of excess heat.

In addition to biooxidizing sulfide minerals, many thermophilic microorganisms also oxidize elemental sulfur and ferrous iron. By oxidizing elemental sulfur, which is thought to contribute to a blinding of the surface of the chalcopyrite and other hypogenic copper sulfides during biooxidation, the use of thermophiles may improve the leach rate of these minerals by minimizing the amount of sulfur that is deposited on their surface during the bioleaching process. By oxidizing ferrous iron to ferric iron, these microorganisms also help maintain a high redox potential within the heap and allow for additional ferric leaching of the sulfide minerals in the heap.

Some examples of thermophilic microorganisms capable of oxidizing ferrous, sulfide minerals and sulfur are: *Acidianus brierleyi, Acidianus infernus, Metallosphaera sedula, Sulfolobus acidocaldarius, Sulfolobus BC,* and *Sulfolobus metallicus*. These thermophilic organisms are capable of leaching both the hypogenic copper sulfide concentrate and the ore substrates of the preferred heap design in a period of less than 90 days at a temperature of 60 to 80° C. Other extreme thermophiles that are known in the art and that can grow and leach copper sulfides as well as other sulfide minerals within this temperature range may also be used to practice the present invention.

Heap 20 is preferably inoculated with a mixed thermophile culture that contains two or more thermophiles. Although these microorganisms all thrive at high temperatures, at low pH, and can utilize mineral sulfides as energy sources, they differ in such attributes as optimum growth temperature, affinity for and ability to leach particular minerals, and tolerance of solution components (e.g., salts). Moreover, because the conditions within the heap may vary sufficiently in terms of temperature, salt concentrations, etc, certain thermophiles may thrive in some regions while others thrive in other regions. Thus, by inoculating with a mixed thermophile culture, the most potent species will dominate within the particular bioleach conditions present within the heap or a region within the heap, resulting in the best possible leach.

Only a small fraction, generally less than one percent, of soil microbes can be cultured well in the laboratory. Therefore, by inoculating heaps with only fresh laboratory thermophilic cultures only a small fraction of the possible microorganisms that exist in nature are being tapped. A continuously operating high temperature heap, however, will naturally select for microorganisms that are best able to bioleach copper sulfide ore at high temperatures. Thus, because a large amount of ore and rock that is used to build each heap will also contain native microbes, the process according to the present invention will also automatically select the native microorganisms that have enzymes, as well as other native biomolecules, that are able to bioleach sulfide minerals at high temperature. Furthermore, because the solutions and/or support rock are likely to contain microbes that have not been previously isolated or that cannot be maintained well in a laboratory culture by existing technology, the operating heap will become a source of microbes that are not currently available from any known culture collections. As a result, the heaps of hypogenic copper sulfide bearing ore that are processed in accordance with the present invention will provide an excellent source of microorganisms for use as an inoculum for starting biooxidation in subsequent heaps that are processed according to the present invention. Previously biooxidized heaps will also provide an excellent source of microorganisms for use as an inoculum in other high temperature heap biooxidation processes, including, for example, high temperature heap biooxidation processes for recovering gold and other precious metals from refractory sulfide ores and high temperature heap biooxidation processes of base metal sulfide ores.

As noted above, the preferred heap design is one that is over 3 meters high and 10 meters wide. Heaps of this size will help maximize heat retention in the majority of the heap. This is because the outer most extremities of the heap will act as a heat insulator for the rest of the heap. Depending on how well the heap is insulated and the outside environment, however, the outer most extremities of the heap may not reach a temperature over 50° C. Inoculating the heap with a combination of mesophiles and moderate thermophiles will, therefore, aid in the bioleaching of the cooler regions of the heap. Even though the amount of copper extraction from these cooler regions will be less than the extraction possible within the higher temperature regions of the heap, the overall extraction of the entire heap will be improved. Thus, in a preferred mode of practicing the present invention, in addition to inoculating the heap with one or more thermophiles, the heap is also inoculated with one or more mesophilic and/or one or more moderate thermophilic microorganisms.

In a preferred method of practicing the present invention, a substantial portion of the heat required to initially heat the heap to temperature is derived from bioleaching sulfide minerals contained within the heap.

If heap 20 contains sufficient exposed readily biooxidizeable sulfide minerals such as pyrite, arsenopyrite, chalcocite, and covellite, then heap 20 may be heated, at least partially, by utilizing the fuel values of these exposed, readily biooxidizeable sulfide minerals. This is accomplished by inoculating the heap with a culture containing one or more mesophilic microorganisms capable of biooxidizing sulfide minerals that are well known in the art. As biooxidation proceeds, the heat generated from the exothermic oxidation reactions of the exposed, readily biooxidizeable sulfide minerals will begin to heat the heap. A significant portion of the heat required to heat heap 20 to temperature of 50° C., or preferably 60° C., may be supplied by biooxidation if enough sulfide mineral particles are bioleached to oxidize at least 10 Kg of sulfide sulfur per tonne of solids in the heap within a period of 45 days or less, and preferably 30 days or less. Thus, in order to heat heap 20 using the heat released through the biooxidation of sulfide minerals, heap 20 should be constructed to contain at least one exposed readily biooxidizeable sulfide mineral in sufficient quantities to supply the heap with at least 10 Kg of sulfide sulfur per tonne of solids.

If the heat released through biooxidation is to be used as the heat source for heating heap 20 to temperature, then the concentration of exposed hypogenic copper sulfides in the heap is also preferably sufficient to supply at least 10 Kg sulfide sulfur to the heap. This is so that once the heap is heated to temperature, there will be sufficient sulfide minerals remaining in the heap to help maintain the temperature above the target temperature for biooxidation of the hypogenic copper sulfides to proceed over a period of approximately 60 to 150 days.

Heap 20 will typically be heated in a step-wise fashion if the heat released through biooxidation is to be used to heat the heap. First, the heap is inoculated with one or more mesophiles that are capable of biooxidizing sulfide minerals. It is then inoculated with a culture comprising one or more moderate thermophiles. Alternatively, these inoculations may occur simultaneously if desired. Mesophiles typically operate within a temperature range of about 25° C. to 40° C., while moderate thermophiles typically operate in a range of about 40° C. to 55° C. Thus the mesophiles can be used to heat the heap up to a temperature of about 40° C. Once the heap reaches a temperature of about 40° C., the mesophiles will become less active. However, if the heap has also been inoculated with moderate thermophiles, these microorganisms will become active as the temperature of the heap approaches about 40° C. The moderate thermophiles can then continue to oxidize the exposed sulfide mineral particles in the heap until a substantial portion of the heap reaches a temperature of about 50° C. to 55° C. where the moderate thermophiles start to become less active. At this point, however, the growth of extreme thermophiles is favored. As a result, the extreme thermophiles within the heap will become active and begin to oxidize additional sulfide minerals in the heap further increasing the temperature of the heap. At temperatures above about 50° C. and especially over about 60° C., the rate of biooxidation of the hypogenic copper sulfide minerals in the heap will rapidly increase due to the fact that the passivation layer that inhibits bioleaching at lower temperatures tends to degrade at temperatures above about 50° C.

Any of the mesophilic or moderatly thermophilic microorganisms that are known in the art to be capable of biooxidizing sulfide minerals may be used in the present invention. Examples of mesophiles that may be used in practicing the present invention include *Thiobacillus ferrooxidans, Thiobacillus thiooxidans, Thiobacillus organoparus, Thiobacillus acidophilus*, and *Leptospirillum ferrooxidans*. Examples of moderate thermophiles that may be used in practicing the present invention include *Sulfobacillus thermosulfidooxidans, Thiobacillus caldus*, and *Thiobacillus cuprinus*.

The heap is irrigated with a process leach solution (PLS) throughout the biooxidation period. The process leach solution typically includes sulfuric acid and iron in ferric and/or ferrous form. The process leach solution may also contain nutrients to help the biooxidizing microorganisms grow. However, the nutrients necessary for the microorganisms to grow and metabolize the sulfide minerals in the heap may be present within the ore being bioleached.

The leaching of hypogenic copper sulfides such as chalcopyrite can consume acid and cause the pH of the heap to increase. The increasing pH can lead to jarosite formation and ferric precipitation. To prevent this precipitation from becoming extensive and retarding the leaching process, the process leach solution should be maintained below a pH of 1.5, especially once the heap reaches a temperature above 50° C. and the biooxidation of the hypogenic copper sulfide minerals begins to proceed rapidly. To further minimize the precipitation of ferric and jarosite, the ferric concentration should also be maintained below 3 g/l, especially once the heap is raised to a temperature above about 50° C. The nutrient salts should also be kept low after the temperature of the heap is raised above about 50° C., especially in potassium and in ammonium sulfate, both of which can increase jarosite formation. The addition of a small amount of chloride (1 to 5 g/l as NaCl) may help maintain ferric in solution and enhance leaching of copper over iron. Thus, it may be desirable to use a chloride medium to bioleach the heap, especially after the temperature of the heap is raised above 50° C. If a chloride medium is used for the process leach solution, however, thermophilic microorganisms that exhibit chloride resistance should be selected.

The flow rate at which the heap is irrigated with the process leach solution will depend on a number of factors. Two of the primary functions of the process leach solution are to provide acid and remove copper that has been dissolved during the bioleaching process. As a result, the peak flows will typically occur at the beginning of the process to reduce the pH of the heap to a suitable level that is conducive to the bioleaching process. Once the off solution from the heap is below a pH of about 2.0, preferably about 1.8, the heap is adequately conditioned and appropriate conditions should exist within the heap for bioleaching.

The application rate of the process leach solution will also tend to be higher once the heap reaches optimum temperature for hypogenic copper sulfide mineral biooxidation. As the temperature of the heap is raised to a temperature suitable for biooxidation of hypogenic copper sulfide minerals, the hypogenic copper sulfide minerals in the heap will begin to biooxidize rapidly. Because the biooxidation of hypogenic copper sulfides consumes acid, additional process leach solution will typically need to be added to maintain a low pH environment suitable for further biooxidation. The rate of biooxidation of the hypogenic copper sulfide minerals will tend to be greatest for a period shortly after the heap is raised to the optimum temperature. As a result, the application rate of the process leach solution will also tend to be high during the period when biooxidation of the hypogenic copper sulfide minerals proceeds rapidly in the heap.

As the copper sulfide minerals in the heap are biooxidized, copper will dissolve into the process leach solution, thereby forming a pregnant process leach solution. In determining the appropriate application rate of the process leach solution, therefore, it is also desirable to utilize a flow rate that will ensure a copper concentration of greater than 1 g/l, preferably greater than 2 g/l, and even more preferably greater than 5 g/l. This is particularly true once the biooxidation of the hypogenic copper sulfide minerals, which will be the primary type of copper sulfide minerals in the heap, begins to proceed rapidly. The flow rate of the process leach solution should be adequate, however, to ensure that the final concentration of the ferric iron in the pregnant process leach solution is less than 5 g/l and preferably less than 3 g/l. While concentrations up to 5 g/l ferric ion may typically be handled in known in the art solvent extraction processes, concentrations greater than about 3 g/l will tend to result in excess ferric and jarosite precipitation in the high temperature environment of the heap.

Finally, the flow rate of the process leach solution is preferably selected to accomplish the foregoing goals with the lowest application rate possible. By maintaining the flow rate of the process leach solution at the lowest possible level to accomplish the foregoing goals, the amount of heat lost from the heap can be minimized, thus minimizing the potential need for the application of external heat to maintain the heap at the optimal temperature during hypogenic copper sulfide mineral biooxidation.

With the foregoing goals in mind, the process leach solution will typically be applied at a rate of at least 72 $l/m^2/day$, and preferably at a rate of least 144 $l/m^2/day$. For heaps having the preferred dimensions mentioned above, the process leach solution will generally be applied at a rate of about 300 to 600 $l/m^2/day$.

The application of the process leach solution does not have to be continuous. The present invention may be practiced with irrigation followed by drying or rest periods. While no process leach solution is applied during the drying period, or dry cycle as it is sometimes referred to in the art, the heap is not permitted to dry out during this rest period. Rather, the heap will typically continue to produce drainages throughout the dry or rest period.

As the pregnant process leach solution drains from the heap, it will collect in drain 35. From drain 35, the pregnant process leach solution may be drained by gravity or pumped to reservoirs 26 via pipe 36. Preferably, the pregnant process leach solution is transferred to reservoirs 24 as quickly as possible to minimize heat losses from the pregnant process leach solution. To further minimize heat losses from the pregnant process leach solution, reservoirs 24 may be insulated.

Once the concentration of copper in the pregnant process leach solution reaches a desired level, the pregnant process leach solution is sent to a solvent extraction plant 38 for recovery of copper. The design, construction, and operation of solvent extraction plants are well known in the art and need not be described further herein. Elemental copper 44 may be recovered from the pregnant strip liquor 40 coming out of the solvent extraction plant using an electrowinning cell 42 as is well known in the art. After copper is removed from the pregnant strip liquor in electrowinning cell 42, the fresh strip liquor 46 is recycled to the solvent extraction plant 38 for reloading.

After the copper values in the pregnant processes leach solution have been stripped in solvent extraction plant 38, the replenished process leach solution 48 may be recycled to the heap for another pass through the heap. Because most solvent extraction plants are operated at a temperature below about 50° C., the pregnant process leach solution that is supplied to the solvent extraction plant will typically need to be cooled to a temperature suitable for the solvent extraction plant. On the other hand, the refreshed process leach solution is preferably heated to a temperature as close to the operating temperature of the heap prior to its reapplication to minimize the heat drains on the system. Thus, in a preferred method of practicing the present invention, the refreshed process leach solution 48 and pregnant process leach solution are passed through separate sides of a heat exchanger 50 prior to delivering the collected process leach solution to the solvent extraction plant. In this way, heat may be removed from the collected pregnant process leach solution in preparation for its treatment in the solvent extraction plant 38 and transferred to the refreshed process leach solution 48 prior to its application to the heap, thus minimizing heat losses from the system. After passing through heat exchanger 50, the process leach solution may be pumped to the top of heap 20 through supply line 30. Fresh water supply 52 may be used to make up for water losses in the system due to evaporation.

In addition to using solvent extraction to recover copper from the pregnant process leach solution, other techniques that are known in the art may also be employed, including copper cementation and ion exchange.

Ion exchange processes offer an advantage due to the fact that they can be operated at higher temperatures than solvent extraction plants. As a result, less heat will be lost from the system because the need to cool the process leach solution prior to copper recovery may be effectively eliminated. Copper cementation offers a similar advantage. However, the purity of copper produced through copper cementation is not as high as that produced through solvent extraction followed by electrorefining. Furthermore, due to the fact that the copper in solution is replaced with iron during the cementation process, the use of copper cementation would also require frequent treatments of the process leach solution to remove excess iron concentrations to prevent excessive precipitation.

Figure 2A:
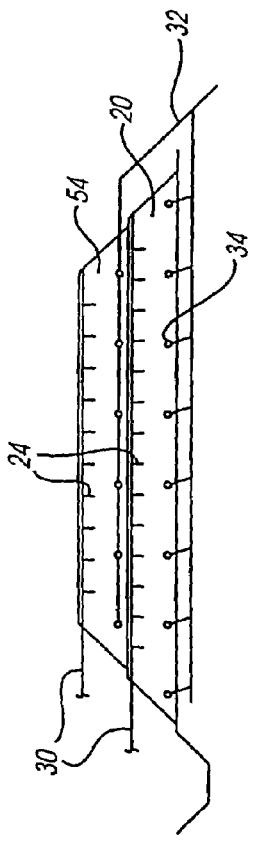
FIGS. 2A–2D illustrate another method of practicing the present invention.
Figure 2B:
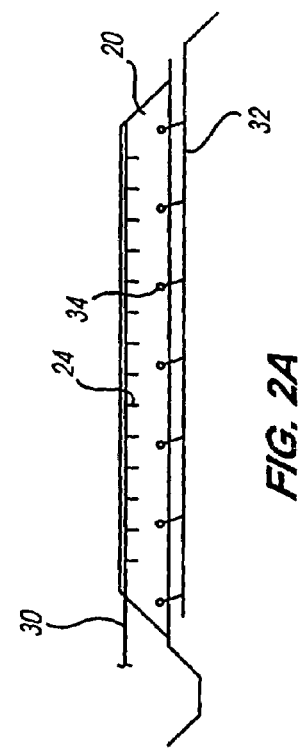
Figure 2C:
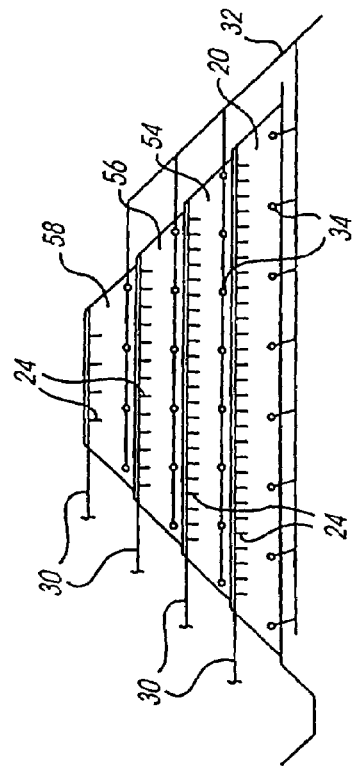
Figure 2D:
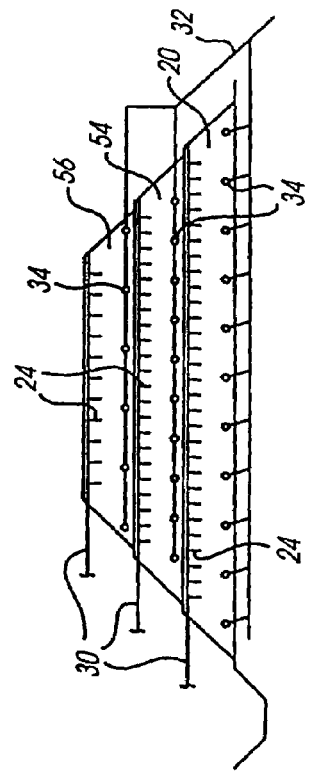

FIGS. 2A–2D schematically illustrate a manner of practicing the present invention over a period of time to more effectively utilize the heat values produced through the oxidation of the sulfide minerals in the heap. Essentially an initial heap 20 is prepared as described above. After heap 20 has reached an optimum temperature for the biooxidation of the hypogenic copper sulfide minerals contained therein, approximately 60 to 70° C., and the oxidation of the hypogenic copper sulfides is proceeding rapidly therein, a second heap or lift 54 may be added on the top of heap 20. The heat emitted from currently active heap 20 will help to heat heap 54 to a temperature at which biooxidation of the hypogenic copper sulfides within heap 54 may proceed rapidly. Again, once the high temperature biooxidation of the hypogenic copper sulfides is proceeding rapidly in heap 54 and a substantial portion of heap 54 has reached a temperature of approximately 60 to 70° C., a third heap or lift 56 may be constructed on top of heap 54. Again, the heat emitted from active heap 56 will help to heat heap 56 to a temperature at which the high temperature biooxidation of the hypogenic copper sulfides in the heap may proceed. This process may be repeated over and over again with as many heaps or lifts as desired. FIG. 2D, for example, illustrates a fourth heap or lift 58 being constructed on top of third heap 56.

Another advantage of practicing the present invention in a series of stacked heaps or lifts is that as the sulfide mineral fuel values in the lower heaps or lifts are depleted through the biooxidation process, the temperature of these lower heaps will begin to drop. However, heat from the upper heaps or lifts will help to maintain the lower heaps at a temperature sufficient for the high temperature biooxidation of hypogenic copper sulfides to continue for a period longer than would otherwise be possible. Furthermore, even if the exposed sulfide mineral values in the lower heaps are depleted to the point that, even with the additional heat being supplied by the upper heaps, the heap cannot maintain a temperature high enough for the thermophilic microorganisms to remain active, biooxidation may continue with mesophilic and thermophilic microorganisms. Moreover, the high concentrations of ferric that are produced in the upper heaps will also aid in the continued leaching of the copper sulfide minerals in the lower heaps or lifts. Thus by practicing the invention in a series of stacked heaps or lifts as described above, it may be possible to achieve higher overall recoveries of copper from the ore.

The preferred embodiments of the invention having been described, various aspects of the invention are further amplified in the examples that follow. Such amplifications are intended to illustrate the invention disclosed herein, and not to limit the invention to the examples set forth. For example, the specific examples described below are all directed to chalcopyrite bearing ores and concentrates because these ores and concentrates are preferred for use in practicing the present invention in view of the fact that chalcopyrite is economically the most important source of copper. However, as described above, the process according to the present invention may be used to bioleach all types of hypogenic copper sulfide bearing ores and concentrates.

EXAMPLE 1

Samples of recalcitrant chalcopyrite ore and concentrate from the San Manuel Copper Mine in Arizona were used to evaluate the use of thermophilic microorganisms to bioleach chalcopyrite in a heap process. In order to simulate the heap leaching process, a column test was performed. A total of 491.2 g of smelter feed chalcopyrite concentrate were coated onto 5 Kg of ore from the same San Manuel Mine. Because the concentrate was smelter grade, the sulfide mineral particles within the concentrate were comprised almost entirely of chalcopyrite. Analysis of the smelter concentrate showed that it contained 28.5% copper and 27.5% iron and 33.6% sulfur as sulfide. Thus, without considering the exposed sulfide minerals in the coarse ore support, the concentrate coated ore contained at least 3% exposed sulfide sulfur.

The support rock that the concentrate was coated onto was prepared by size separation of crushed San Manuel ore. The minus 19 mm crushed ore was separated into a minus 3.2 mm fraction, a 3.2 to 6.4 mm fraction and a 6.4 mm to 12.7 mm fraction and a plus 12.7 mm fraction. The 3.2 to 6.4 mm and the 6.4 to 12.7 mm fractions were used in equal weights (2.5 Kg each) as support rock for the smelter concentrate. The minus 3.2 mm and plus 12.7 mm fractions were not used in the test. Exclusion of the minus 3.2 mm fraction ensured that the heap had good air flow characteristics.

Analysis of the 3.2 to 6.4 mm ore indicated that it contained 0.549% copper and 2.37% iron. Analysis of the 6.4 to 12.7 mm ore contained 0.523% copper and 2.38% iron. The mixture of the two sizes of chalcopyrite ore were coated with the high grade copper concentrate by rolling the ore in a drum at about 30 rpm while spraying with 10% sulfuric acid. After the support rock was wetted the dry concentrate was spread over the tumbling support rock.

More liquid was sprayed onto the mixture until the coarse ore particles were coated with the concentrate. The final water content of the concentrate coated coarse ore particles was approximately 3% by weight.

The mixture of concentrate and coarse ore support was then placed into an 8.0-cm glass column to simulate a heap. The column was wrapped with electrical resistive heating tape to insulate the column and help control temperature. The temperature was monitored by a thermocouple taped to the outside of the glass tube and a glass thermometer in the top of the ore at the top of the column. Air and liquid were introduced into the top of the column. The air was heated by bubbling through heated water and then through a heated stainless steel tube to the top of the column. Liquid was collected from the bottom of the column in a heated beaker. Air exiting the bottom of the column was bubbled through the liquid in the heated beaker. This was done to keep any bacteria in the solution alive and active. The flow rate of the liquid pumped to the top of the column was at least one liter per day. The pH of the solution was measured once per day and adjusted to a pH of between 1.1 and 1.3 with sulfuric acid. The copper and iron levels in solution were determined once or twice per week. Solution was removed from the system and replaced with new solution containing the nutrient mixture. This was done to keep the solution from becoming too high in copper and toxic to the microorganisms. The liquid medium introduced to the top of the column contained 0.16 g/l, $NH_4Cl$, 0.326 g/l $Mg Cl_2 6H_2O$, 0.1 g/l $K_2HPO_4$, 0.1 g/l KCl, plus 1 ml/l of a trace mineral solution listed in Table 1 below. As those skilled in the art will appreciate, the concentration of nutrients in the liquid medium were lower than that typically found in the 9K salt generally used in connection with biooxidation. The lower concentration of nutrients as well as the chloride medium and low pH were used to minimize the precipitation of ferric as jarosite and any concomitant plugging of air or liquid flow channels that might otherwise result.

TABLE 1

TRACE MINERAL SOLUTION

| | g/l |
|---|---|
| $MnCl_2 \times 4 H_2O$ | 1.8 |
| $Na_2B_4O_7 \times 10 H_2O$ | 4.5 |
| $ZnSO_4 \times 7 H_2O$ | 0.22 |
| $CuCl_2 \times 2 H_2O$ | 0.05 |
| $Na_2MoO_4 \times 2 H_2O$ | 0.03 |
| $VOSO_4 \times 2 H_2O$ | 0.03 |
| $CoSO_4$ | 0.01 |

The temperature of the column was first maintained at 35° C. and inoculated on day three with 25 ml of *Thiobacillus ferrooxidans*, which were originally started with ATCC strains 19859, 14119, 23270, and 33020 from the American Type Culture Collection in Rockville, Md. The bacteria concentration was approximately $10^8$ bacteria per ml. On day four the temperature of the column was increased to 40° C. On day five the temperature was increased to 45° C. On day seven the temperature was increased to 65° C. and reinoculated with 25 ml of a mixed culture of *Thiobacillus ferrooxidans, Leptospirillum ferrooxidans*, and cultures of *Thiobacillus thiooxidans* (ATCC strains 8085 and 15494) and a culture of moderate thermophiles isolated from an ore sample from the Atlanta Mine of the Ramrod Gold Co. in Idaho. On day 14 the temperature of the column was increased to 70° C. The column was then inoculated with a previously frozen mixed culture of extreme thermophiles comprising *Acidianus brierleyi* (DSM strain 1651), and *Sulfolobus acidocaldarius* (ATCC strains 33909 and 49426). The DSM strains were obtained from the Deutsche Sammlung von Mikroorganismen collection center in Braunschweig, Germany. As biooxidation within the heap had not increased as much as desired even though the heap was inoculated with a mixed culture of thermophiles on day 14, on day 40 a fresh culture of extreme thermophiles including *Acidianus brierleyi* (DSM strains 1651 and 6334), *Acidianus infernus*, (DSM strain 3191) *Metallosphaera sedula* (ATCC strain 33909) *Sulfolobus acidocaldarius* (ATCC strain 49426) and *Sulfolobus metallicus* (DSM strain 6482) was added to the column. The temperature of the column and the heated container of circulating solution were maintained between 60 and 75° C. for the remainder of the 93-day experiment.

Figure 3:
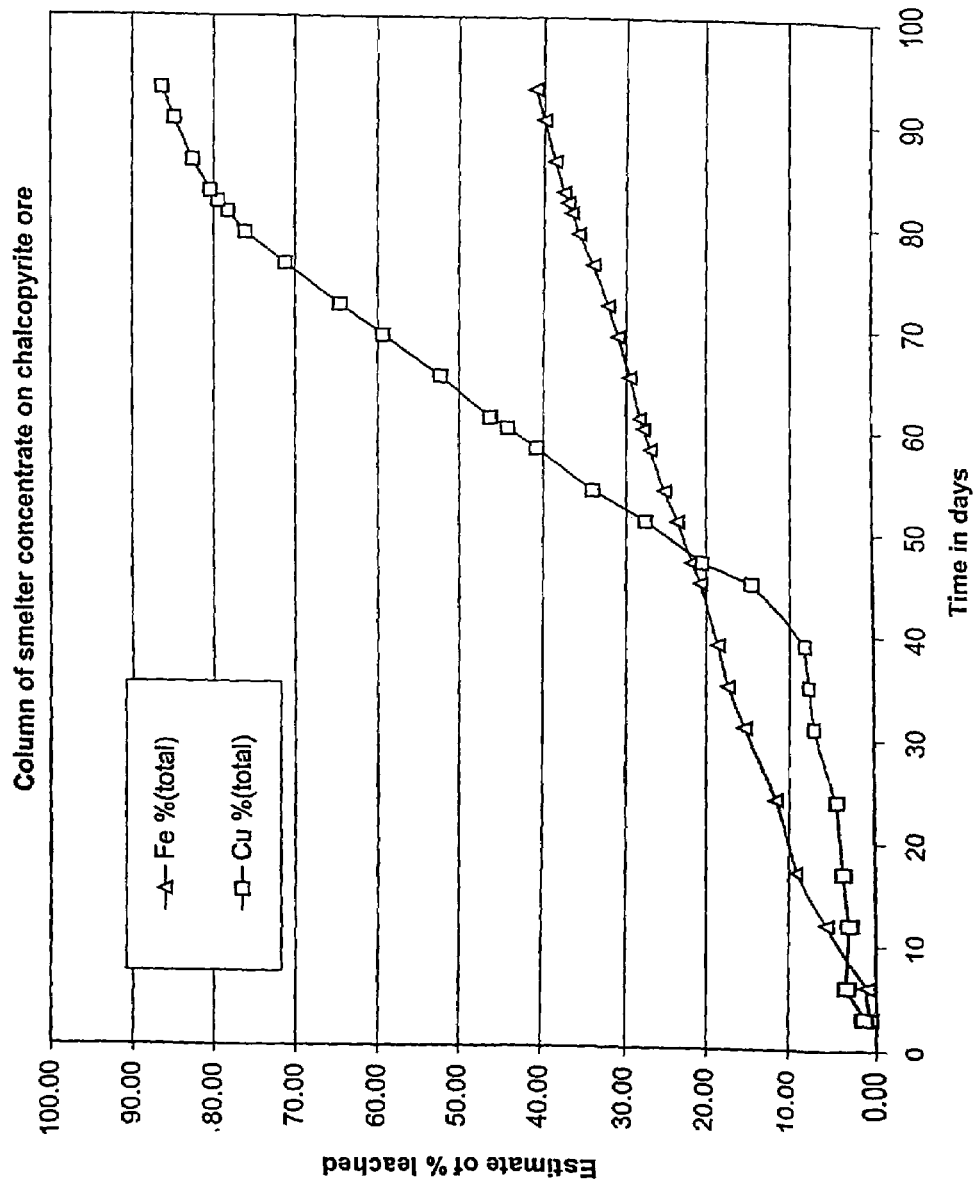
FIG. 3 is a chart illustrating the estimated percent of copper and iron leached for Example 1 which illustrates certain principles of the present invention.

The progress of the experiment was monitored by the solubilization of copper. The total copper in both the concentrate and the ore support was estimated by the analysis of a split sample of each size fraction of ore support used and the chalcopyrite concentrate. The estimated percentages leached for both iron and copper as the experiment progressed are listed in Table 2 and are plotted against time in FIG. 3. The concentrations of both iron and copper in the circulating solutions are also listed in Table 2.

TABLE 2

CHALCOPYRITE SMELTER CONCENTRATE ON CHALCOPYRITE ORE

| Days | Con. of Fe g/l | Con. of Cu g/l | Fe % leached | Cu % leached |
|---|---|---|---|---|
| 3 | 0.456 | 0.508 | 0.66 | 1.13 |
| 6 | 2.16 | 0.68 | 0.89 | 2.78 |
| 12 | 4.856 | 0.56 | 4.89 | 2.46 |
| 17 | 4.032 | 0.444 | 8.91 | 3.08 |
| 24 | 1.772 | 0.224 | 11.81 | 3.79 |
| 31 | 1.3 | 0.452 | 15.32 | 6.59 |
| 35 | 1.164 | 0.34 | 17.31 | 7.30 |
| 39 | 0.716 | 0.24 | 18.57 | 7.94 |
| 45 | 0.684 | 0.976 | 20.70 | 14.51 |
| 47 | 0.643 | 1.732 | 21.78 | 20.48 |
| 51 | 2.26 | 5.84 | 23.60 | 27.53 |
| 54 | 1.924 | 5.1 | 25.21 | 34.12 |
| 58 | 1.86 | 4.764 | 26.94 | 40.80 |
| 60 | 1.352 | 3.48 | 27.81 | 44.23 |
| 61 | 0.864 | 2.376 | 28.26 | 46.33 |
| 65 | 0.876 | 2.64 | 39.52 | 52.33 |
| 69 | 0.912 | 2.832 | 31.01 | 59.39 |
| 72 | 0.669 | 1.86 | 32.22 | 64.52 |
| 76 | 0.62 | 1.512 | 34.03 | 71.23 |
| 79 | 0.652 | 1.232 | 35.72 | 76.09 |
| 81 | 0.812 | 1.268 | 36.62 | 78.22 |
| 82 | 0.464 | 0.736 | 37.12 | 79.44 |
| 83 | 0.584 | 0.832 | 37.59 | 80.42 |
| 86 | 0.924 | 1.228 | 38.66 | 82.57 |
| 90 | 0.464 | 0.532 | 39.96 | 84.83 |
| 93 | 0.655 | 0.632 | 40.97 | 86.33 |

The rate of copper leaching showed a noticeable increase 16 days after inoculation with the first culture of extreme thermophiles. The second inoculation of extreme thermophiles increased the rate of copper leaching even more by day 47 of the experiment. The rate of leaching did not slow down until after day 86 of the experiment when the estimated total copper leached was 82.6%. After another week the column was taken down so that each fraction could be analyzed for the extent of copper leaching.

The material in the column was separated into four size fractions. One fraction was smaller than 0.14 mm and weighed 224.6 g. This size fraction was considered to be the remaining chalcopyrite concentrate. Another size fraction was larger than 0.14 mm and smaller than 3.2 mm and weighed 340.8 g. This size range of material was never put into the column and was believed to be the result of breakdown of the 2.5 Kg of 3.2 mm to 6.4 mm ore that was put into the column at the start. The amount of material remaining in the 3.2 mm to 6.4 mm size range was 2,108 g. The weight of the remaining 6.4 mm to 12.7 mm was 2,304 g.

Analysis of each size fraction was used to calculate the extent of chalcopyrite leaching for both the concentrate and the ore. The analysis of the 224.6 g of smelter concentrate showed 3.24% copper and 18.5% iron or a total of 7.28 g of copper and 41.6 g of iron. The original 491.2 g of copper concentrate was 28.5% copper and 27.5% iron and therefore contained 140.0 g of copper and 135.1 g of iron. The calculated percentage leached was 94.8% for copper and 69.2% for iron. The estimate of copper and iron leaching of the 3.2 to 6.4 mm ore used as support was based on the 0.355% copper and 4.19% iron remaining in the 0.14 mm to 3.2 mm size fraction and the 0.305% copper and 2.08% iron remaining in the 3.2 mm to 6.4 mm size fraction. The total remaining copper and iron was 7.64 g and 58.1 g, respectively. Thus, the calculated percentage leached for the original 3.2 to 6.4 mm size fraction was 44.3% for copper and 1.8% for iron. The high level of remaining iron suggested that this size fraction contained some of the concentrate or contained precipitated iron. The largest size fraction was 0.353% copper and 2.27% iron. The total remaining copper was 8.13 g and the total remaining iron was 52.3 g out of the original 13.08 g of copper and 59.5 g of iron. The amount of copper and iron leached for this size fraction was 37.8% and 12.1%, respectively. The low level of iron removal indicated that some iron had precipitated. The calculated total copper that leached from the mixture of chalcopyrite ore and concentrate was 86.2% and 40.1% for iron. This agreed very well with the extent of leaching estimated by analysis of the circulating solution.

EXAMPLE 2

The experiment described in Example 1 was repeated using 486.8 g of the same smelter grade concentrate that was used in that experiment. The support rock that the concentrate was coated onto comprised 2.5 Kg of 3.2 mm to 6.4 mm ore and 2.5 Kg of 6.4 mm to 12.7 mm ore. The mixture of the two sizes of chalcopyrite ore was coated with the high-grade concentrate by rolling the ore in a drum at about 3 rpm, while spraying with water. Water was used in this experiment to show that acid could be added later. The dry concentrate was spread over the wetted tumbling plurality of substrate ore as was done is Example 1. The final water content of the coated coarse ore particles was approximately 3% by weight. Furthermore, as with Example 1, without considering the exposed sulfide minerals in the coarse support, the concentrate coated ore contained approximately 3% exposed sulfide sulfur.

The concentrate coated substrates were placed into an 8.0 cm glass column. The column was wrapped with electrical resistive heating tape to insulate the column and to help control its temperature. The temperature was monitored by a thermocouple taped to the outside of the column and a glass thermometer placed in the center of the ore in the top of the column. An additional 100 g of the uncoated mixture of ore from 3.2 mm to 12.7 mm was used to cover the concentrate coated ore material. This uncoated ore formed a layer about 5 cm thick that covered the coated substrates and acted as an insulating layer to prevent heat loss at the top of the bed.

Air and liquid were introduced into the top of the column as was done in Example 1. The air was heated by bubbling through heated water and a heated stainless steel tube as was done in Example 1. The liquid exiting the column was held in a heated beaker as described in Example 1.

For the first three days the temperature of the column was maintained at 35° C. while two liters of 5% sulfuric acid were circulated through the column at a flow rate in excess of one liter per day. The high concentration of acid rapidly adjusted the pH to below 1.0. On the third day the temperature was increased to 70° C. and the same nutrient mixture as described in Example 1 was used to replace the circulating acid solution. After about four hours the column was inoculated with the same culture of extreme thermophiles, namely *Acidianus brierleyi* (DSM strains 1651 and 6334), *Acidianus infernus* (DSM strain 3191), *Sulfolobus acidocaldarius* (ATCC strain 49426), and *Sulfolobus metallicus* (DSM strain 6482), that was used to inoculate the column of Example 1 on day 40. Seven days later (day 10 from the start) the column was inoculated with a culture of microorganisms recovered from the take down of the column in Example 1. Bacteria can be recovered after the biooxidized concentrate is washed from the substrate. The slurry of stripped concentrate is allowed to settle overnight. The cloudy liquid can have high levels ($10^7$ or more bacteria per ml) of bacteria that can be used to inoculate directly or that can be centrifuged to form even higher concentrations of bacteria. About one fourth the bacteria recovered this way from the column experiment in Example 1 were used to inoculate the repeat column in this example on day 10.

After the initial treatment with 5% sulfuric acid, the pH of the process leach solution added to the top of the heap was kept between a pH of 1.1 and 1.3. The pH of the off solution was generally between 1.3 and 1.6. The copper and iron levels in solution were determined once or twice a week. Solution was removed from the system and replaced with new solution containing the nutrient mixture. This was done for the same reason that it was in Example 1, namely to keep below the toxic level of copper until the microorganisms had time to adapt to high copper concentrations.

The major difference between the experiment in Example 1 and this one is the early use of high temperature (70° C.) and early inoculation with a fresh culture of extreme thermophiles.

Figure 4:
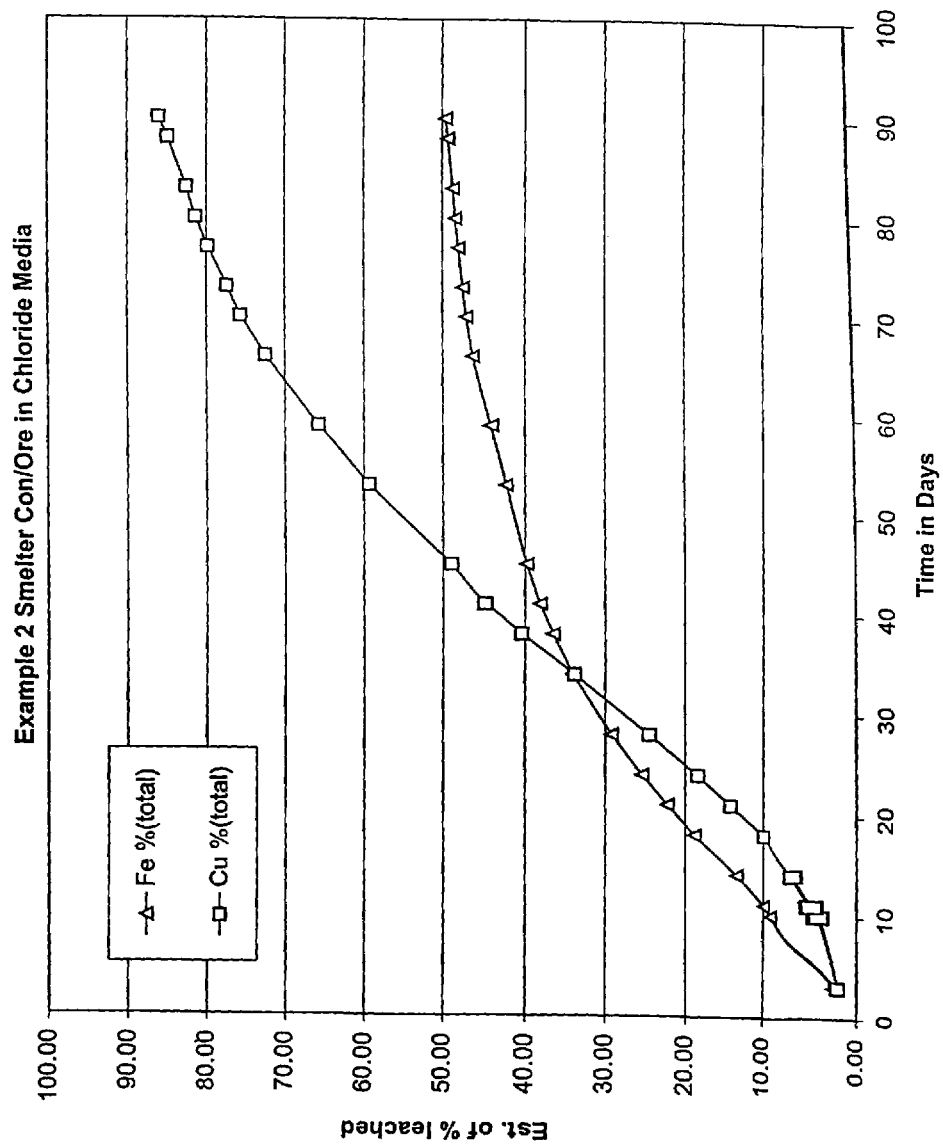
FIG. 4 is a chart illustrating the estimated percent of copper and iron leached for Example 2 which illustrates certain principles of the present invention.

The extent of copper and iron leaching was estimated by determination of the copper and iron concentrations in solution, which are plotted against time in FIG. 4. The earlier start of leaching, which in the present example is a result of the earlier inoculation, demonstrates the benefit of using extremely thermophilic microorganisms in leaching recalcitrant chalcopyrite. The material from this column was separated into size fractions. The fraction smaller than 0.14 mm material weighed 315.4 g and contained 2.74% copper and 12.7% iron by analysis. The original 486.8 g of copper concentrate contained 138.7 g of copper and 133.8 g of iron. The calculated percentage leached was 93.8% for copper and 70.0% for iron. The estimate of copper and iron leaching for the 0.14 to 12.7 mm ore used as support was based on the 15.36 g of copper and 78.9 g of iron remaining in this size fraction. The calculated percentage leached was 43.8% of the copper and 34.9% of the iron.

EXAMPLE 3

A sample of chalcopyrite concentrate from the San Manuel copper mine in Arizona was used to perform a 35° C. control experiment in a similar column test. A total of 391.8 g of smelter grade concentrate containing 28.8% copper and 27.3% iron was coated on to a plurality of granite support rocks. The 3920 g of support rock that was coated had no copper mineral in it and was between 6.4 and 12.7 mm in size. The sample of granite support rock had a small amount of carbonate and tended to cause some precipitation of iron. The method of coating was similar to the method used in Examples 1 and 2 with the exception that about 110 ml of bacteria containing solution were used to wet the support rock before applying the dry concentrate.

As the concentrate contained over 30% sulfide sulfur, the concentrated coated support rock contained approximately 3% exposed sulfide sulfur.

The mixture of concentrate and coarse granite support rock were placed in a 7.6-cm plastic column. The column was wrapped with resistive electrical heating tape to insulate the column and to help control temperature. In this example the temperature was maintained at 35° C. throughout the experiment. Air and liquid were introduced into the top of the column. Liquid was collected from the bottom of the column and pH adjusted before reapplying it to the top of the column. The pH of the off solution ranged between 1.37 and 1.76 and the pH of the reapplied solution was between 1.2 and 1.5. The copper and iron levels in solutions were determined at least once per week. Solution removed from the system was replaced with new pH adjust nutrient solution. The medium contained 1.0 g/l $NH_4SO_4$; 0.2 g/l $MgSO_4$ $7H_2O$ 0.02 g/l $K_2HPO_4$; 0.03 g/lKCl. This experiment did not use the chloride nutrient solution used in Examples 1 and 2. The nutrient solution used in Examples 1 and 2 was used in order to minimize the amount of iron precipitation at the higher leach temperature of 70° C.

The bacteria concentration in the solution that was used to wet the coarse ore was approximately $10^8$ bacteria per ml and was of the same mixed culture used in the first inoculation of Example 1. On day 44,990 ml of 10.08 g/l ferric solution was added to the circulating five liters of solution to increase the iron level to approximately 2 g/l. The iron level had been low (less than 1 g/l) for the first 44 days. After the ferric addition the iron levels remained over 1 g/l until after day 85. The copper level of the solution was maintained at above 1 g/l after the first 10 days.

The control experiment was conducted for 100 days. The Eh exceeded 0.6 volts after 50 days. The high Eh indicated that bacteria growth and bioleaching were in progress during most of the 100-day experiment. However, only 20% of the copper was leached after 60 days, and only 25.2% after 100 days. The experiment was stopped after 100 days. The material from the column was separated into a minus 0.14 mm and a plus 0.14 mm size fraction. Each fraction was analyzed to determine the copper remaining in the system. The weight of the granite support rock increased to 4087.2 g and had picked up 0.928% copper. The weight of the concentrate had dropped to 218.6 g and the copper content was 19.4%. The total copper remaining in the column after 100 days of bioleaching was 80.34 g or 71.2% of the original 112.8 g. The copper analysis of the solution estimated that 25.3% had leached out of the column. This compares well with the 28.8% calculated by final copper analysis.

Figure 5:
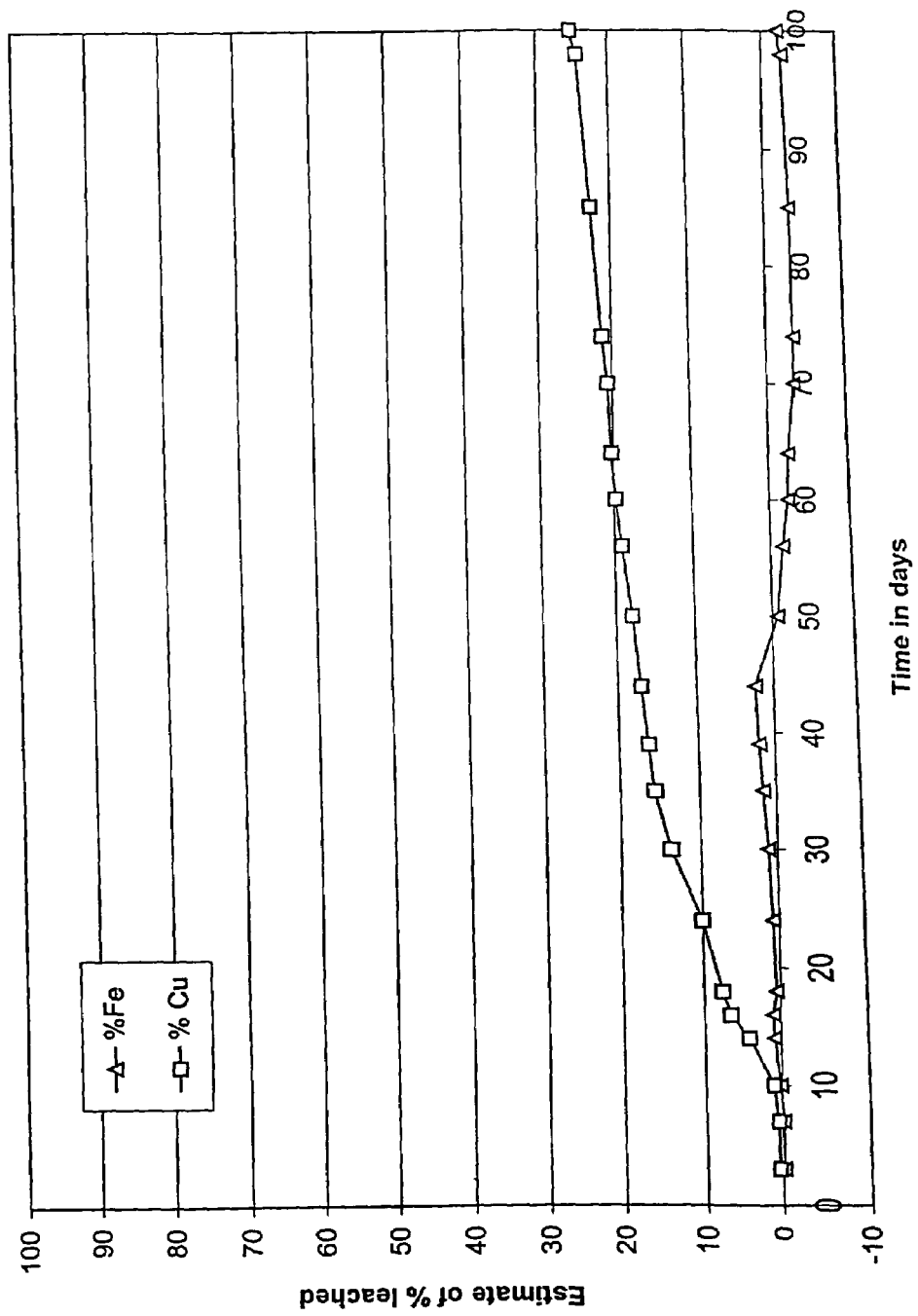
FIG. 5 is a chart illustrating the estimated percent of copper and iron leached for comparative Example 3.

The extent of copper and iron leaching were estimated by determination of the copper and iron concentrations in solution. The estimated extent of leaching for copper and iron are plotted against time in FIG. 5.

EXAMPLE 4

A concentrate was made from the minus 3.2 mm fraction of the San Manuel ore. The concentrate was made by grinding the ore to pass 0.107 mm. The ground ore sample was then floated to form a sulfide concentrate. The flotation was done in small batches of 500 g each in a laboratory Wemco flotation cell. Before flotation, the ground ore sample was adjusted to a pulp density of 30%. Then the pH was adjusted to between 7 and 9 with NaOH. Potassium amyl xanthate was added as a collector at approximately 100 g/tonne and mixed more than 5 minutes before 50 g/tonne of Dowfroth D-200 was added and mixed for another 5 minutes. Finally, air was introduced to produce a sulfide concentrate that contained 8.5% copper and 30.4% iron and 35.8% sulfide by weight. Thus, this concentrate contained almost twice the amount by weight of pyrite as it did chalcopyrite.

A plurality of coated substrates were then made by coating 200 g of the sulfide concentrate on to 2,000 g of plus 6.2 mm minus 12.7 mm granite rock. The concentrate was added as a dry powder to the wetted support rock in a drum rotating at about 30 rpm. The dry concentrate was spread over the tumbling support rock. More liquid was sprayed onto the mixture until the coarse support rock was coated with the concentrate. The final water content of the coated coarse ore particles was approximately 3% by weight. Furthermore, the concentrate coated ore contained approximately 3.2% exposed sulfide sulfur.

The plurality of coated substrates were then put into a 5 cm glass column. The column was wrapped with electrical resistive heating tape to insulate the column and help control temperature. The temperature was monitored by a thermocouple taped to the outside of glass tube and by a glass thermometer placed in the center top of the column. Air and liquid were introduced into the top of the column. The air was passed through heated water before entering the column. Liquid was collected from the bottom of the column but was not heated as it was in Example 1.

The flow rate of liquid pumped to the top of the column was at least 0.5 liters per day. The pH of the solution was measured once per day and adjusted to a pH between 1.1 and 1.3. The first solution used in this experiment was a different chloride nutrient mixture than used in Example 1 above. In this experiment the first nutrient solution comprised 2.03 g/l $NH_4Cl$; 0.08 g/l KCl; 0.04 g/l$K_2HPO_4$; 0.35 g/l $MgCl6H_2O$. On day four this was replaced with a solution that was the same except that it also contained 2 g/l ferric made with ferric sulfate. This solution was again removed and replaced on day seven. The new solution also contained 2 g/l ferric. On day 29 the solution was changed again and replaced with the chloride nutrient solution containing 2 g/l ferric. This solution was recirculated until day 63 when one liter out of the two liters in the beaker was replaced with fresh chloride nutrient solution. Another liter was removed and replaced on day 65 with the chloride nutrient solution. No ferric was added to the solution on days 63 and 65. One liter of solution was replaced with fresh chloride nutrient solution on days 74, 77, 81, 84 and 91. The column experiment was stopped after day 93. The bioleached material from the column was separated into a minus 0.14 mm size fraction and plus 0.14 mm fraction. Each size fraction was analyzed for copper, iron, and sulfide.

Figure 6:
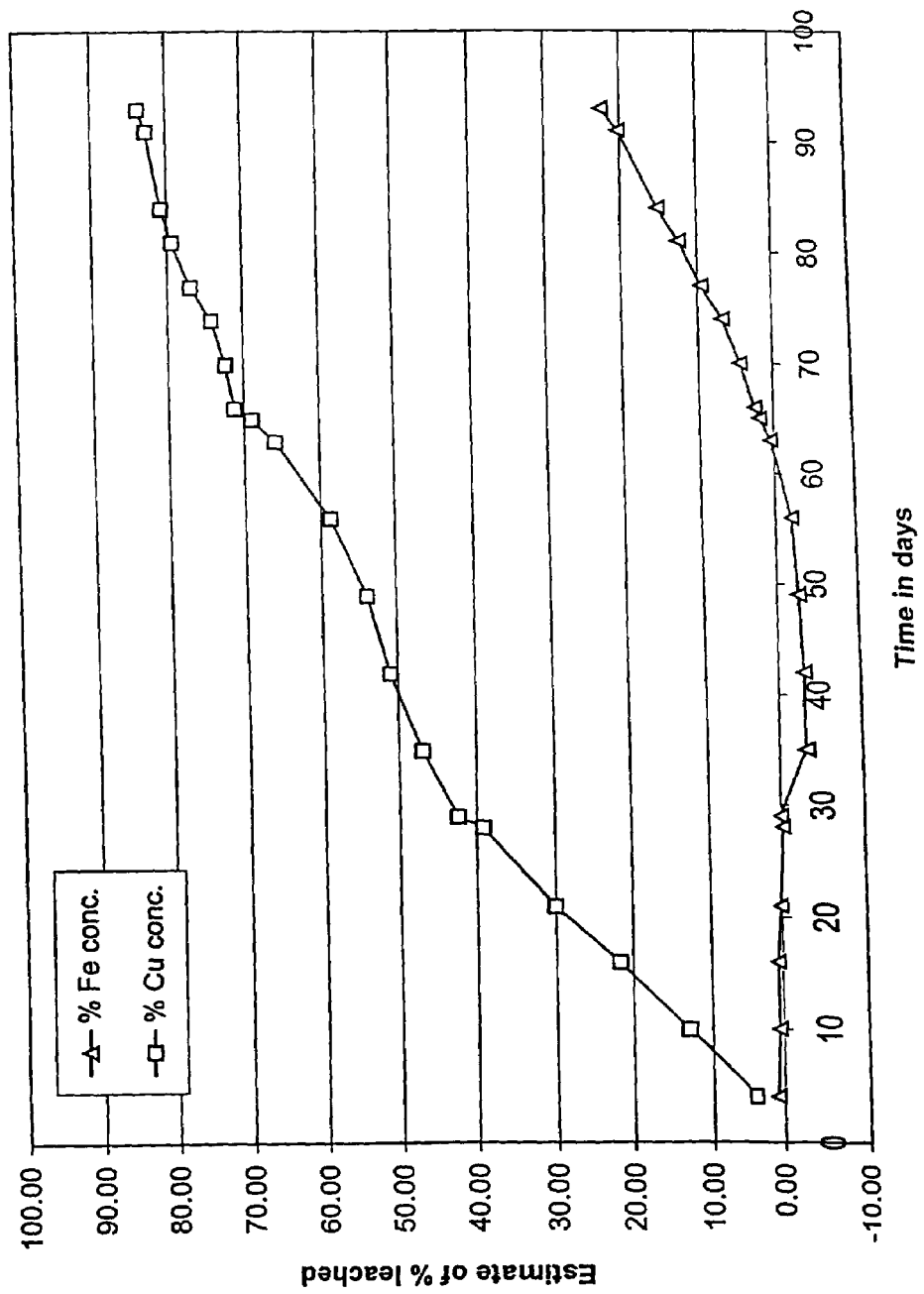
FIG. 6 is a chart illustrating the estimated percent of copper and iron leached for Example 4 which illustrates certain principles of the present invention.

The temperature of the column was first maintained at 35° C. and inoculated with the same bacteria culture as used to initially inoculate the column in Example 1. On day seven the temperature was increased to 40° C. and reinoculated with the same mesophilic culture. The next day the temperature was increased to 45° C. and the column inoculated with a moderate thermophiles isolated from an ore sample from the Atlanta mine of Ramrod Gold in Idaho. On day 10 the temperature was increased to 60° C. On day 11, 25 ml ($10^8$ bacteria per ml) of the same culture of mesophilic bacteria were added to the unheated off solution beaker. The beaker was reinoculated with 25 ml of $10^8$ bacteria per ml on days 13 and 15. On day 18, the column was inoculated with the same previously frozen mixed culture of extreme thermophiles as was used to inoculate the column in Example 1 on day 14. The off solution beaker was further inoculated on day 30 and day 45 with mesophilic bacteria. This column experiment was never inoculated with the fresh culture of extreme thermophiles used in Example 1 at day 40. A plot of the estimated percentage of copper and iron leached is plotted against time in FIG. 6. The use of the granite rock as support may have caused excessive precipitation of iron, due to its carbonate content. The estimated percentage iron leaching did not go above zero until after day 60. This precipitation could have limited the extent of copper leaching in this experiment also. One benefit of having no iron leach during the process, however, is that a purer pregnant leach liquor is produced for the solvent extraction plant.

The final analysis of copper indicated that 82.5% of the copper had been leached from the concentrate. The amount of copper remaining in the 276 g of the minus 0.14 mm material was 0.916%. The weight of the concentrate had increased from precipitation and loss of support rock. During the experiment the 2,000 g of granite support rock lost 140.8 g.

Analysis showed that 28.7% of the iron was removed and that 45.2% of the sulfide sulfur was biooxidized. Microscopic analysis of the water used to wash the coated concentrate off the support rock showed a large number (over $10^7$ microorganisms per ml) of extreme thermophiles.

EXAMPLE 5

Another column experiment was carried out at the same time as the experiment described in Example 4. This experiment was the same with one exception. The difference was that 10 g of finely powdered graphite was mixed with 200 g of bulk flotation concentrate. This was the same concentrate used in Example 4, and the column was set up the same way as in Example 4. The inoculations and pH adjustments were also the same as in Example 4.

Figure 7:
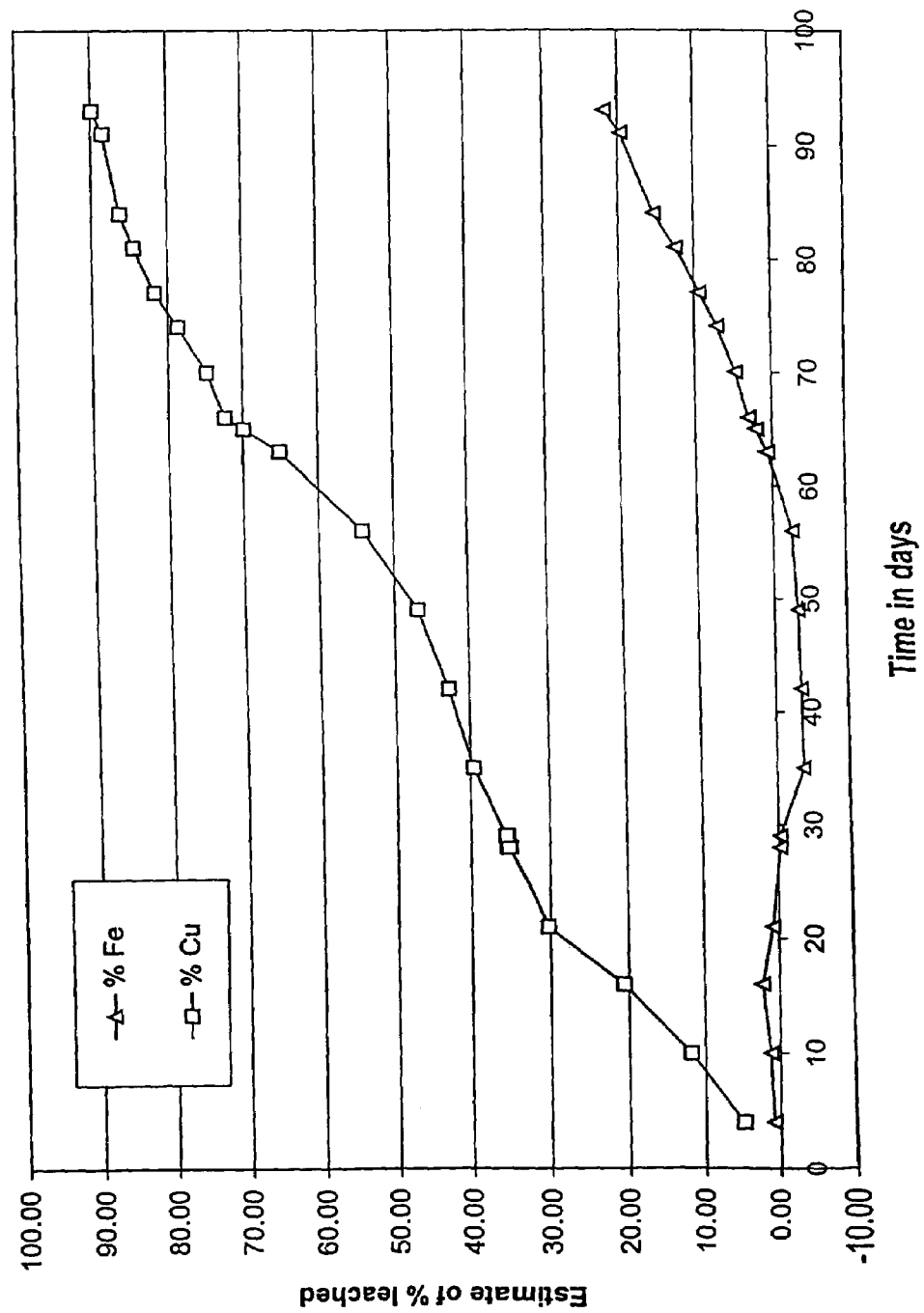
FIG. 7 is a chart illustrating the estimated percent of copper and iron leached for Example 5 which illustrates certain principles of the present invention.

The estimated percentage of copper and iron leached is plotted against time in FIG. 7 for this example.

The column experiment was continued for 93 days. The results of this column experiment indicated 89.8% copper leaching by analysis of off solution and 89.0% by analysis of the material removed from the column. Iron leaching was also low in this experiment and was also believed to be due to precipitation caused by the carbonate in the granite support. Analysis for iron and sulfide sulfur indicated 18.6% iron removal and 53.9% sulfide biooxidation.

The graphite was added to enhance the galvanic connection between chalcopyrite and pyrite in the concentrate.

EXAMPLE 6

The experiment described in Example 1 was repeated using 491.8 g of the same smelter grade concentrate that was used in that experiment. The support rock that the concentrate was coated onto comprised 2.5 Kg of 3.2 mm to 6.4 mm coarse ore and 2.5 Kg of 6.4 mm to 12.7 mm coarse ore. The mixture of the two sizes of chalcopyrite ore were coated with the high grade concentrate by rolling the ore in a drum at about 30 rpm, while spraying with 10% $H_2SO_4$ as was used in Example 1. The dry concentrate was spread over the wetted tumbling plurality of ore substrates as was done is Example 1.

The coated substrates were placed into an 8.0-cm glass column. The column was wrapped with electrical resistive heating tape to insulate the column and help control the temperature. The temperature was monitored by a thermocouple taped to the outside of the column and a glass thermometer in the center top of ore in the column. An additional 100 g of the uncoated ore from 6.4 mm to 12.7 mm was used to cover the coated ore material. This uncoated ore formed a layer about 2 cm thick that covered the coated substrate and acted as an insulating layer to prevent heat loss at the top of the bed.

Air and liquid were introduced into the top of the column as was done in Example 1. The air was heated by bubbling through heated water and a heated stainless steel tube as was done in Example 1. The liquid exiting the column was held in a heated beaker as described in Example 1.

From the first day the temperature of the column was maintained at 70° C. while four liters of a solution having a pH of 1.0 were circulated through the column at a flow rate in excess of one liter per day. The solution used in connection with this example was different than it was in Examples 1 and 2. This media used in this example comprised 0.2 g/l $(NH_4)_2SO_4$, 0.4 g/l $MgSO_4$-$7H_2O$, 0.1 g/l $K_2HPO_4$, 0.1 g/l KCl. The high concentration of acid used to coat the coarse ore support rapidly adjusted the pH of the coated ore to below 1.6. On the second day the column was inoculated with the same culture of extreme thermophiles (*Acidianus brierleyi* (DSM strains 1651 and 6334), *Acidianus infernus* (DSM strain 3191), *Sulfolobus acidocaldarius* (ATCC strain 49426), and *Sulfolobus metallicus* (DSM strain 6482)) that was used to inoculate the column of Example 2. This mixed culture of extreme thermophiles was recovered from the take down of the column in Example 1. Bacteria can be recovered after the biooxidized concentrate is washed from the support material. The slurry of stripped concentrate is allowed to settle overnight. The cloudy liquid can have high levels ($10^7$ or more bacteria per ml) of bacteria that can be used to inoculate directly or that can be centrifuged to form higher concentrations of bacteria.

The pH of the process leach solution added to the top of the column was kept between a pH of 1.1 and 1.3. The pH of the off solution was generally between 1.3 and 1.6. The copper and iron levels in solution were determined once or twice a week. Solution was removed from the system and replaced with new solution containing the nutrient mixture. This was done for the same reason as it was in Example 1, namely to keep below the toxic level of copper until the microorganisms had time to adapt to high copper concentrations.

The major difference between the experiments in Examples 1 and 2 and the present one is the use of a sulfate media to which no chloride had been added.

Figure 8:
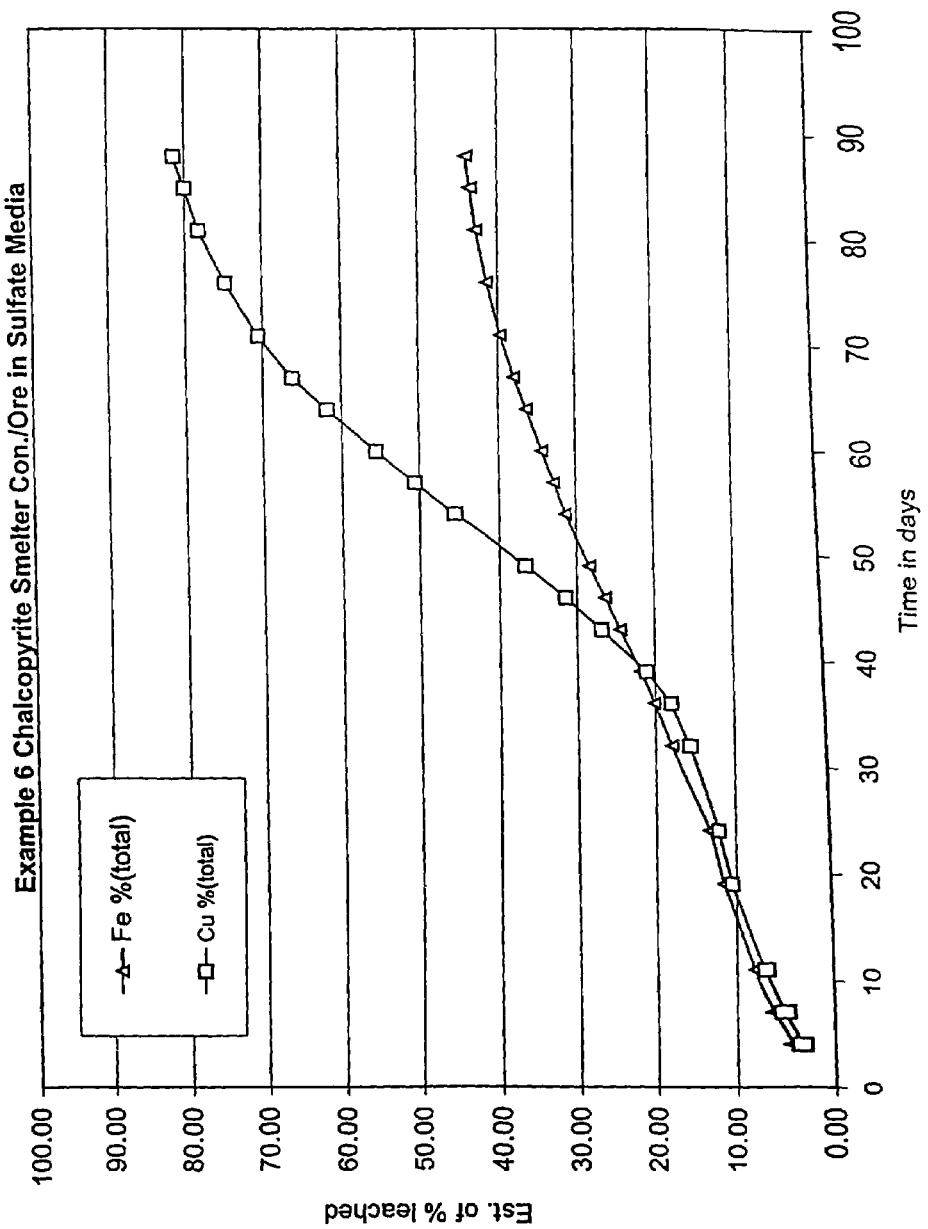
FIG. 8 is a chart illustrating the estimated percent of copper and iron leached for Example 6 which illustrates certain principles of the present invention.

The extent of copper and iron leaching was estimated by determination of the copper and iron concentrations in the off solution, and are plotted against time in FIG. 8.

EXAMPLE 7

Another concentrate was made from the minus 3.2 mm fraction of San Manuel ore. The same procedure was used as was described in Example 4. This bulk pyrite-chalcopyrite concentrate was 7.3% copper, 27.4% iron, and over 30% sulfide sulfur. Thus, this concentrate contained approximately twice the amount by weight of pyrite as it did chalcopyrite. Unlike Example 4, the 443.1 g of this concentrate were coated onto chalcopyrite ore that comprised 2.5 Kg of 3.2 mm to 6.4 mm ore and 2.5 Kg of 6.4 mm to 12.7 mm ore. The mixture of the two sizes of chalcopyrite ore were coated with the low grade concentrate by rolling the ore in a drum at about 30 rpm, while spraying with 10% $H_2SO_4$ as was used in this Example 1. The dry concentrate was spread over the wetted tumbling plurality of coarse ore substrates as was done in Example 1. The final water content of the coated coarse ore particles was approximately 3% by weight. Furthermore, without considering the exposed sulfide mineral particles in the ore support material, the concentrate coated ore contained approximately 2.5% exposed sulfide sulfur.

Because the chalcopyrite concentrate was lower grade than in the previous examples, the amount of copper that was in the concentrate was about the same as the amount of copper that was in the ore support rock (54.2% of the copper was in the coated concentrate and 45.8% was in the ore support rock).

The coated substrates were placed into an 8.0-cm glass column. The column was wrapped with electrical resistive heating tape to insulate the column and help control the temperature. The temperature was monitored by a thermocouple taped to the outside of the column and a glass thermometer placed in the center of the ore in top of the column. An additional 100 g of the uncoated ore from the 6.4 mm to 12.7 mm fraction was used to cover the coated ore material. This uncoated ore formed a layer about 2 cm thick that covered the coated substrate and acted as an insulating layer to prevent heat loss at the top of the bed.

Air and liquid were introduced into the top of the column as was done in Example 1. The air was heated by bubbling through heated water and a heated stainless steel tube as was done in Example 1. The liquid exiting the column was held in a heated beaker as described in Example 1.

From the first day the temperature of the column was maintained at 70° C. while four liters of solution having a pH of 1.0 were circulated through the column at a flow rate in excess of one liter per day. In this example the solution was the same as it was in Examples 1 and 2. The media comprised 0.16 g/l $NH_4Cl$, 0.326 g/l $MgCl$-$6H_2O$, 0.1 g/l $K_2HPO_4$, and 0.1 g/l KCl. The high concentration of acid used to coat the concentrate on the ore support rapidly adjusted the pH to below 1.8. On the second day the column was inoculated with the same culture of extreme thermophiles (*Acidianus brierleyi* (DSM strains 1651 and 6334), *Acidianus infernus*, (DSM strain 3191), *Sulfolobus acidocaldarius* (ATCC strain 49426), and *Sulfolobus metallicus* (DSM strain 6482)) that was used to inoculate the column of Example 2. This mixed culture of extreme thermophiles was recovered from the take down of the column in Example 1. Bacteria can be recovered after the biooxidized concentrate is washed from the substrate. The slurry of stripped concentrate is allowed to settle overnight. The cloudy liquid can have high levels ($10^7$ or more bacteria per ml) of bacteria that can be used to inoculate directly or that can be centrifuged to form higher concentrations of bacteria.

The pH of the process leach solution applied to the top of the column was kept between a pH of 1.1 and 1.3. The pH of the off solution was generally between 1.3 and 1.6. The copper and iron levels in solution were determined once or twice a week. Solution was removed from the system and replaced with new solution containing the nutrient mixture. This was done for the same reason as it was in Example 1, namely to keep below the toxic level of copper until the microorganisms had time to adapt to high copper concentrations.

The major difference between the experiments in Examples 1 and 2 and the present one is the use of a low-grade bulk pyrite-chalcopyrite concentrate. The presence of pyrite can increase the rate of chalcopyrite leaching by galvanic interaction. This example is also different than Examples 4 and 5 because bioleaching was done at 70° C. from the start and the heap was inoculated with the same culture of extreme thermophiles as used in Examples 1, 2, and 6.

Figure 9:
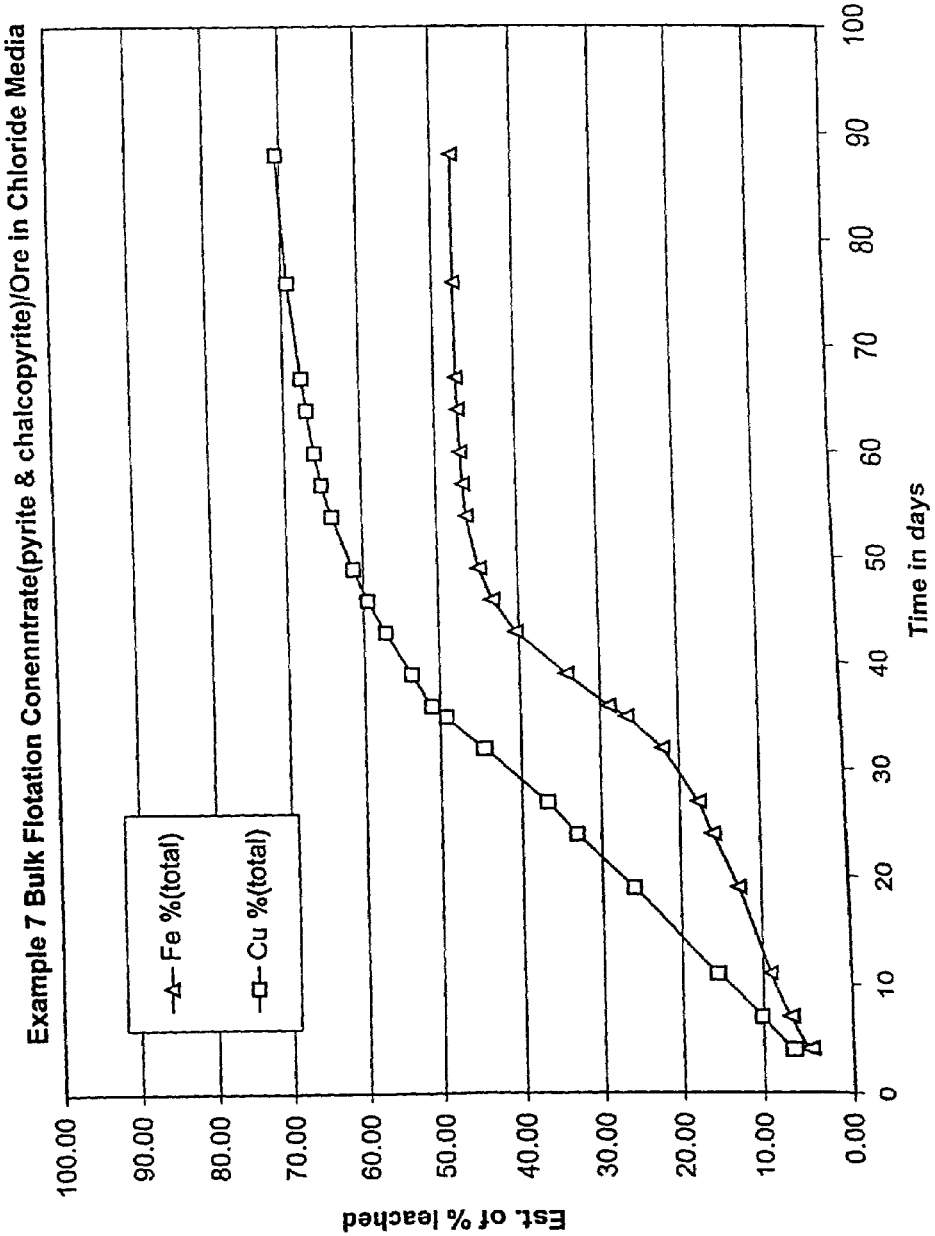
FIG. 9 is a chart illustrating the estimated percent of copper and iron leached for Example 7 which illustrates certain principles of the present invention.

The extent of copper and iron leaching was estimated by a determination of the copper and iron concentrations in solution, and are plotted against time in FIG. 9. The copper leaching slowed after leaching the equivalent of the amount of copper that was estimated to be contained within the bulk concentrate coated on the ore. This was 54.2% of the total copper in the column and was leached before day 40 of the experiment. The remaining copper, believed to be from the support copper ore leached at a slower rate from day 40 on.

Although the invention has been described with reference to preferred embodiments and specific examples, those of ordinary skill in the art will readily appreciate that many modifications and adaptations of the invention are possible without departure from the spirit and scope of the invention as claimed hereinafter.

We claim:

1. A high temperature heap bioleaching process for chalcopyrite bearing ore, the process comprising the steps of:
    a. constructing a heap comprising chalcopyrite bearing ore, said heap including exposed sulfide mineral particles at least 25 weight % of which comprise chalcopyrite, wherein the concentration of exposed sulfide mineral particles in said heap is such that said heap contains at least 10 Kg of exposed sulfide sulfur per tonne of solids in said heap, and wherein at least 50% of the total copper in said heap is in the form of chalcopyrite;
    b. heating a substantial portion of said heap to a temperature of at least 50° C.;
    c. inoculating said heap with a culture comprising at least one thermophilic microorganism that biooxidizes sulfide minerals at a temperature above 50° C.; and
    d. bioleaching sufficient sulfide mineral particles in said heap to oxidize at least 10 Kg of sulfide sulfur per tonne of solids in said heap and to cause the dissolution of at least 50% of the copper in said heap into said process leach solution within a period of about 210 days or less from completion of said heap.

2. A process according to claim 1, wherein said heap includes at least 30 Kg of sulfide sulfur per tonne of solids in said heap.

3. A process according to claim 2, comprising bioleaching sufficient sulfide mineral particles in said heap to oxidize at least 30 Kg of sulfide sulfur per tonne of solids in said heap in a period of about 210 days or less.

4. A process according to claim 1, comprising bioleaching sufficient sulfide mineral particles in said heap to cause the dissolution of at least 70% of the copper in said heap into said process leach solution in about 210 days or less.

5. A process according to claim 3, comprising bioleaching sufficient sulfide mineral particles in said heap to cause the dissolution of at least 70% of the copper in said heap into said process leach solution in about 210 days or less.

6. A process according to claim 1, comprising bioleaching sufficient sulfide mineral particles in said heap to cause the dissolution of at least 80% of the copper in said heap into said process leach solution in a period of about 100 days or less.

7. A process according to claim 3, comprising bioleaching sufficient sulfide mineral particles in said heap to cause the dissolution of at least 80% of the copper in said heap into said process leach solution in a period of about 100 days or less.

8. A process according to claim 1, wherein said substantial portion of said heap is heated to a temperature of at least 60° C.

9. A process according to claim 1, wherein said substantial portion of said heap is heated to a temperature of at least 70° C.

10. A process according to claim 1, wherein said culture comprises a mixed culture including a plurality of different thermophilic microorganisms that biooxidize sulfide minerals at a temperature above 60° C.

11. A process according to claim 10, wherein said culture comprises a mixed culture including a plurality of different thermophilic Archaea that biooxidize sulfide minerals at a temperature above 60° C.

12. A process according to claim 1, wherein said heap is constructed by a process comprising the steps of:
 a. coating the surface of a plurality of coarse substrates having a particle size of greater than about 0.3 cm and less than about 2.54 cm with a sulfide mineral concentrate comprising hypogenic copper sulfides and having a particle size less than about 250 µm; and
 b. stacking said plurality of coated coarse substrates into a pile to form said heap.

13. A process according to claim 12, wherein said plurality of coarse substrates are comprised of at least one material selected from the group consisting of rock, brick, slag, and plastic.

14. A process according to claim 13, wherein said plurality of coarse substrates comprises rock selected from the group consisting of lava rock, barren rock, and crushed copper ore.

15. A process according to claim 12 wherein the amount of concentrate coated onto said plurality of coarse substrates is from approximately 9% to 30% of the combined weight of said concentrate and said coarse substrates.

16. A process according to claim 15, wherein said concentrate further comprises at least one readily oxidizeable sulfide mineral.

17. A process according to claim 16, wherein said at least one readily oxidizeable sulfide mineral comprise at least one sulfide mineral from the group consisting of pyrite, arsenopyrite, covellite, and chalcocite.

18. A process according to claim 16, wherein the amount of sulfide sulfur from said at least one readily oxidizeable sulfide mineral is at least about 10 Kg per tonne of solids in the heap and the amount of sulfide sulfur from said hypogenic copper sulfides is at least about 10 Kg per tonne of solids in the heap.

19. A process according to claim 18, wherein said substantial portion of said heap is heated to a temperature of 50° C. in a period of approximately 45 days or less and at least a portion of the heat required to heat said heap is supplied by bioleaching at least 10 Kg of sulfide sulfur per tonne of solids in said heap.

20. A process according to claim 1, further comprising an insulating barrier layer covering said heap.

* * * * *

UNITED STATES PATENT AND TRADEMARK OFFICE
CERTIFICATE OF CORRECTION

| | | |
|---|---|---|
| PATENT NO. | : 7,160,354 B2 | Page 1 of 1 |
| APPLICATION NO. | : 10/964208 | |
| DATED | : January 9, 2007 | |
| INVENTOR(S) | : Kohr et al. | |

It is certified that error appears in the above-identified patent and that said Letters Patent is hereby corrected as shown below:

column 23, line 50, to change "3" to read -- 30 --

Signed and Sealed this

Sixth Day of May, 2008

JON W. DUDAS
*Director of the United States Patent and Trademark Office*